US011119355B2

(12) United States Patent
Adachi

(10) Patent No.: US 11,119,355 B2
(45) Date of Patent: Sep. 14, 2021

(54) ELECTRO-OPTICAL DEVICE

(71) Applicant: Japan Display Inc., Tokyo (JP)

(72) Inventor: Masaya Adachi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/072,188

(22) Filed: Oct. 16, 2020

(65) Prior Publication Data

US 2021/0033921 A1 Feb. 4, 2021

Related U.S. Application Data

(63) Continuation of application No. PCT/JP2018/044546, filed on Dec. 4, 2018.

(30) Foreign Application Priority Data

Apr. 17, 2018 (JP) .............................. JP2018-079139

(51) Int. Cl.
*G02F 1/1335* (2006.01)
*G02B 5/28* (2006.01)
*G02F 1/1343* (2006.01)

(52) U.S. Cl.
CPC ....... *G02F 1/133536* (2013.01); *G02B 5/283* (2013.01); *G02F 1/13439* (2013.01); *G02F 1/133512* (2013.01); *G02F 1/133531* (2021.01)

(58) Field of Classification Search
None
See application file for complete search history.

(56) References Cited

U.S. PATENT DOCUMENTS 7,495,719 B2 2/2009 Adachi et al.
2004/0051827 A1* 3/2004 Hinata .............. G02F 1/133528
349/113

(Continued)

FOREIGN PATENT DOCUMENTS

JP 2000-267584 A 9/2000
JP 2004-069926 A 3/2004

OTHER PUBLICATIONS

International Search Report dated Feb. 26, 2019 in PCT/JP2018/044546 filed on Dec. 4, 2018, 2 pages.

*Primary Examiner* — Ryan Crockett
(74) *Attorney, Agent, or Firm* — Oblon, McClelland, Maier & Neustadt, L.L.P.

(57) ABSTRACT

An electro-optical device includes a transmission polarization axis conversion unit having a first surface and a second surface, an absorption polarization unit having transmission polarization axis in a first direction and having absorption polarization axis in a second direction, and a reflective polarization unit including a region having a transmission polarization axis in the first direction and a reflective polarization axis in the second direction, and an opening. The transmission polarization axis conversion unit can switch a first/second state, the first state is an incident light entering the first surface from the absorption polarization unit is converted into a first outgoing light of linearly polarized light in the second direction, and the first outgoing light is emitted from the second surface, the second state is the incident light converted into a second outgoing light of linearly polarized light in the first direction and emitted from the second surface.

12 Claims, 21 Drawing Sheets

(56) References Cited

U.S. PATENT DOCUMENTS

2009/0027600 A1* 1/2009 Hisatake ........... G02F 1/133536
  349/98
2017/0357112 A1* 12/2017 Shibahara ........... G02F 1/13471
2019/0113790 A1* 4/2019 Hakoi ................. G02F 1/13362

* cited by examiner

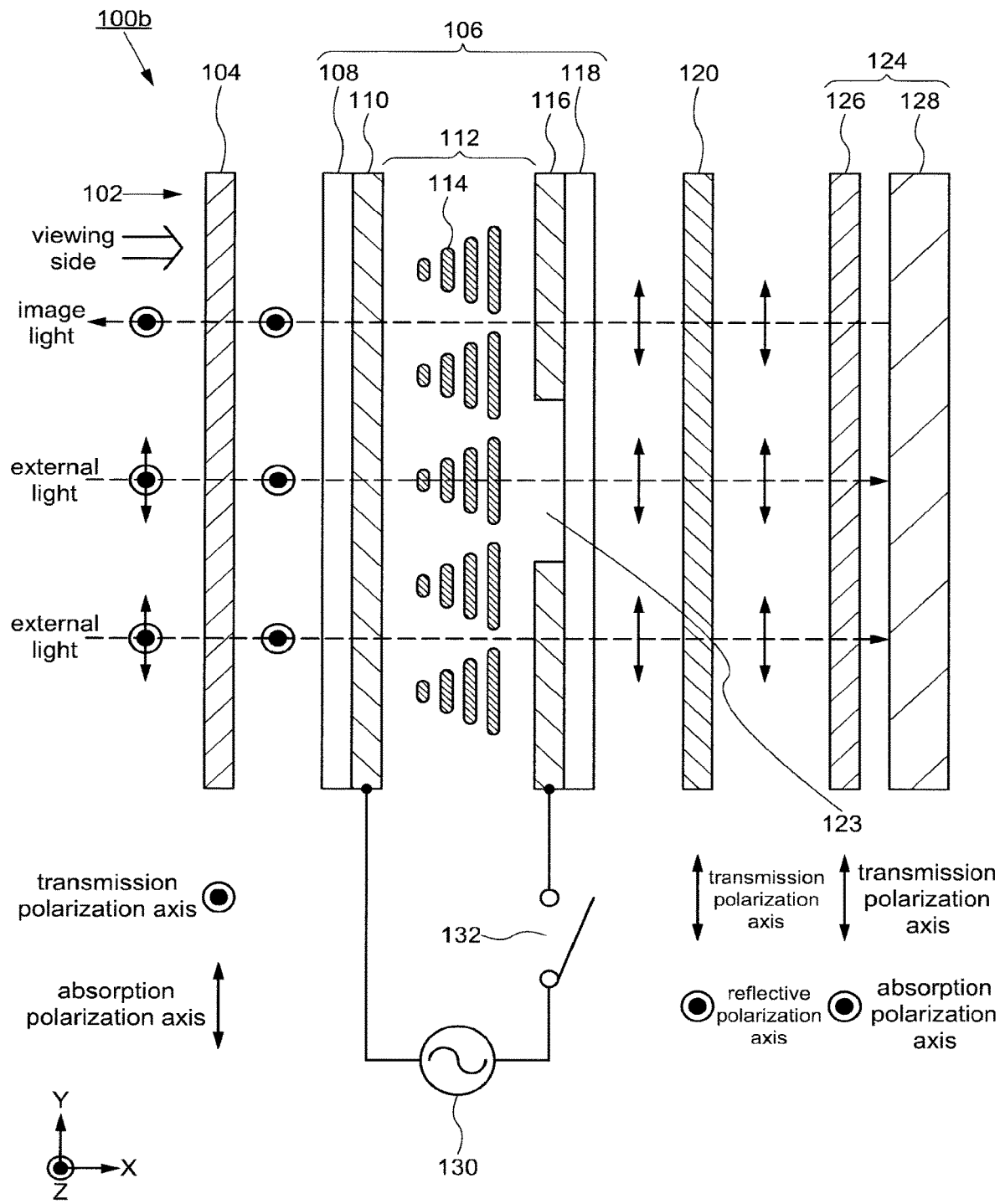

ELECTRO-OPTICAL DEVICE

CROSS REFERENCE TO RELATED APPLICATIONS

This application is based upon and claims the benefit of priority from the prior Japanese Patent Application No. 2018-079139, filed on Apr. 17, 2018, and PCT Application No. PCT/JP2018/044546 filed on Dec. 4, 2018, the entire contents of which are incorporated herein by reference.

FIELD

One embodiment of the present invention relates to an electro-optical device for displaying images utilizing polarization of light and electro-optical effects of a liquid crystal.

BACKGROUND

The large screen of the liquid crystal television advances and the product with the screen size over 80 inches is also on the market today. Liquid crystal TVs with 80-inch screens are larger than 2 m in diagonal length of the screen. The liquid crystal televisions with such a large screen display powerful images, but the screen becomes black when not watching (when the switch is turn off). Most of the screens of the liquid crystal televisions are black rectangular screens (when they are off) from the functional side. The black large screen of the liquid crystal television has a sense of intimidation and cannot harmonize with other home electric appliances and furniture as an interior.

In the field of display devices, it has been proposed to use a display screen for other applications when images are not displayed. For example, Japanese laid-open patent publication No. 2001-318374 discloses a display device capable of switching a display screen between an image-display state and a mirror-state.

SUMMARY

An electro-optical device in an embodiment according to the present invention includes a transmission polarization axis conversion unit having a first surface and a second surface opposite to the first surface, an absorption polarization unit having transmission polarization axis in a first direction and having absorption polarization axis in a second direction orthogonal to the first direction, and a reflective polarization unit including a region having a transmission polarization axis in the first direction and a reflective polarization axis in the second direction, and an opening. The transmission polarization axis conversion unit includes a first substrate, a second substrate disposed opposite the first substrate, a first transparent electrode and a second transparent electrode disposed between the first substrate and the second substrate, and a liquid crystal layer disposed between the first transparent electrode and the second transparent electrode, the absorption polarization unit disposed on a side of the first surface of the transmission polarization axis conversion unit, the reflective polarization unit disposed on a side of the second surface of the transmission polarization axis conversion unit. The transmission polarization axis conversion unit can switch between a first state and a second state, the first state is a state in which incident light entering the first surface from the absorption polarization unit is converted into a first outgoing light of linearly polarized light in the second direction, and the first outgoing light is emitted from the second surface, the second state is a state in which the incident light is converted into a second outgoing light of linearly polarized light in the first direction and emitted from the second surface.

An electro-optical device in an embodiment according to the present invention includes a transmission polarization axis conversion unit having a first surface and a second surface opposite to the first surface, an absorption polarization unit having a transmission polarization axis in a second direction and an absorption polarization axis in a first direction orthogonal to the second direction, or a first reflective polarization unit having a transmission polarization axis in the second direction and a reflective polarization axis in the first direction, and a second reflective polarization unit having a reflective polarization axis in the second direction and a transmission polarization axis in the first direction. The transmission polarization axis conversion unit includes a first substrate, a second substrate disposed opposite the first substrate, a first transparent electrode and a second transparent electrode disposed between the first substrate and the second substrate, and a liquid crystal layer disposed between the first transparent electrode and the second transparent electrode, the absorption polarization unit or the first reflective polarization unit disposed on a side of the first surface of the transmission polarization axis conversion unit, and the second reflective polarization unit disposed on a side of the second surface of the transmission polarization axis conversion unit. At least one of the first transparent electrode and the second transparent electrode and the liquid crystal layer have a first region which does not overlap in a plan view.

An electro-optical device in an embodiment according to the present invention includes a transmission polarization axis conversion unit having a first surface and a second surface opposite to the first surface, an absorption polarization unit having a transmission polarization axis in a second direction and an absorption polarization axis in a first direction orthogonal to the second direction, and a reflection type polarization unit having a reflective polarization axis in the second direction and a transmission polarization axis in the first direction. The transmission polarization axis conversion unit includes a first substrate, a second substrate disposed opposite the first substrate, a first pixel electrode and a second pixel electrode disposed between the first substrate and the second substrate, and a liquid crystal layer disposed between the first pixel electrode and the second pixel electrode, the absorption polarization unit is disposed on a side of the first surface of the transmission polarization axis conversion unit, and the reflective polarization unit is disposed on a side of the second surface of the transmission polarization axis conversion unit. At least one of the first pixel electrode and the second pixel electrode includes a first electrode and a second electrode separated from each other, and an alignment of liquid crystal molecules in the liquid crystal layer facing the first electrode and an alignment of liquid crystal molecules in the liquid crystal layer facing the second electrode can be controlled to be different from each other.

BRIEF DESCRIPTION OF DRAWINGS

FIG. 4 is a diagram showing a configuration of an electro-optical device according to an embodiment of the present invention and illustrating a case where a display screen is a transparent mode;

DESCRIPTION OF EMBODIMENTS

Figure 1:
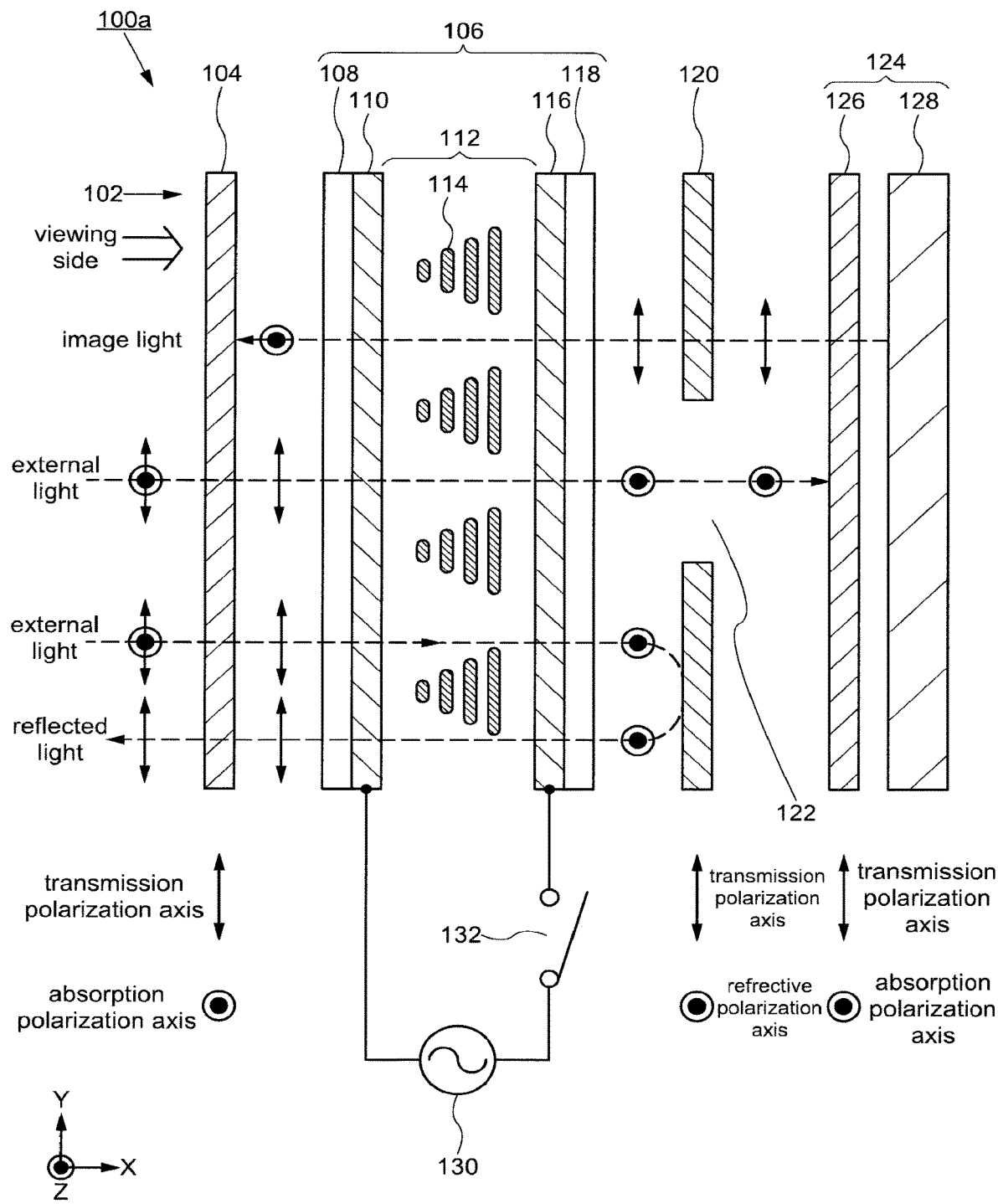
FIG. 1 is a diagram showing a configuration of an electro-optical device according to an embodiment of the present invention and illustrating a case where a display screen is a mirror mode.

Hereinafter, embodiments of the present invention will be described with reference to the drawings and the like. The present invention may be carried out in various embodiments, and should not be construed as being limited to any of the following embodiments. In the drawings, components may be shown schematically regarding the width, thickness, shape, and the like, instead of being shown in accordance with the actual sizes, for the sake of clear illustration. The drawings are merely examples and do not limit the present invention in any way. In the specification and the drawings, components that are substantially the same as those described or shown previously bear the identical reference signs thereto (or the identical reference signs followed by letters "a", "b" or the like), and detailed descriptions thereof may be omitted. The terms "first", "second" and the like used for elements are merely provided for distinguishing the elements and do not have any other significance unless otherwise specified.

In the following explanation, unless otherwise stated, in view of cross section, for example, the view side or the side where the display screen is located may be described as "front side" or "top side", the side viewed from "above" or "upper side" may be described as "top" or "top side", and the reverse may be described as "lower", "under", "bottom", "under side", or "bottom side".

In the following description, X-axis, Y-axis, Z-axis, or X-direction, Y-direction, and Z-direction are shown in the figure, there are cases where the direction along the Y-axis is a first direction, the direction along the Z-axis perpendicular to the Y-axis is a second direction, and the direction along the X-axis perpendicular to the Y-axis and the Z-axis is a third direction.

An electro-optical device is a device that includes an electro-optic material whose optical properties change with electrical energies. The electro-optical material includes a liquid crystal, an organic electroluminescent material, and the like. For example, the electro-optical device shall include a device including a liquid crystal layer, a device including an organic electroluminescent material, a device having a dispersed media in which electrophoretic particles are dispersed, a device using quantum-dots, a device using a micro-LED, and the like. The electro-optical device also includes a device for controlling the direction of reflection of light by electric signals, for example, a display device having a mechanical micromirror element.

First Embodiment 1-1. Configuration of the Electro-Optical Device

Figure 2:
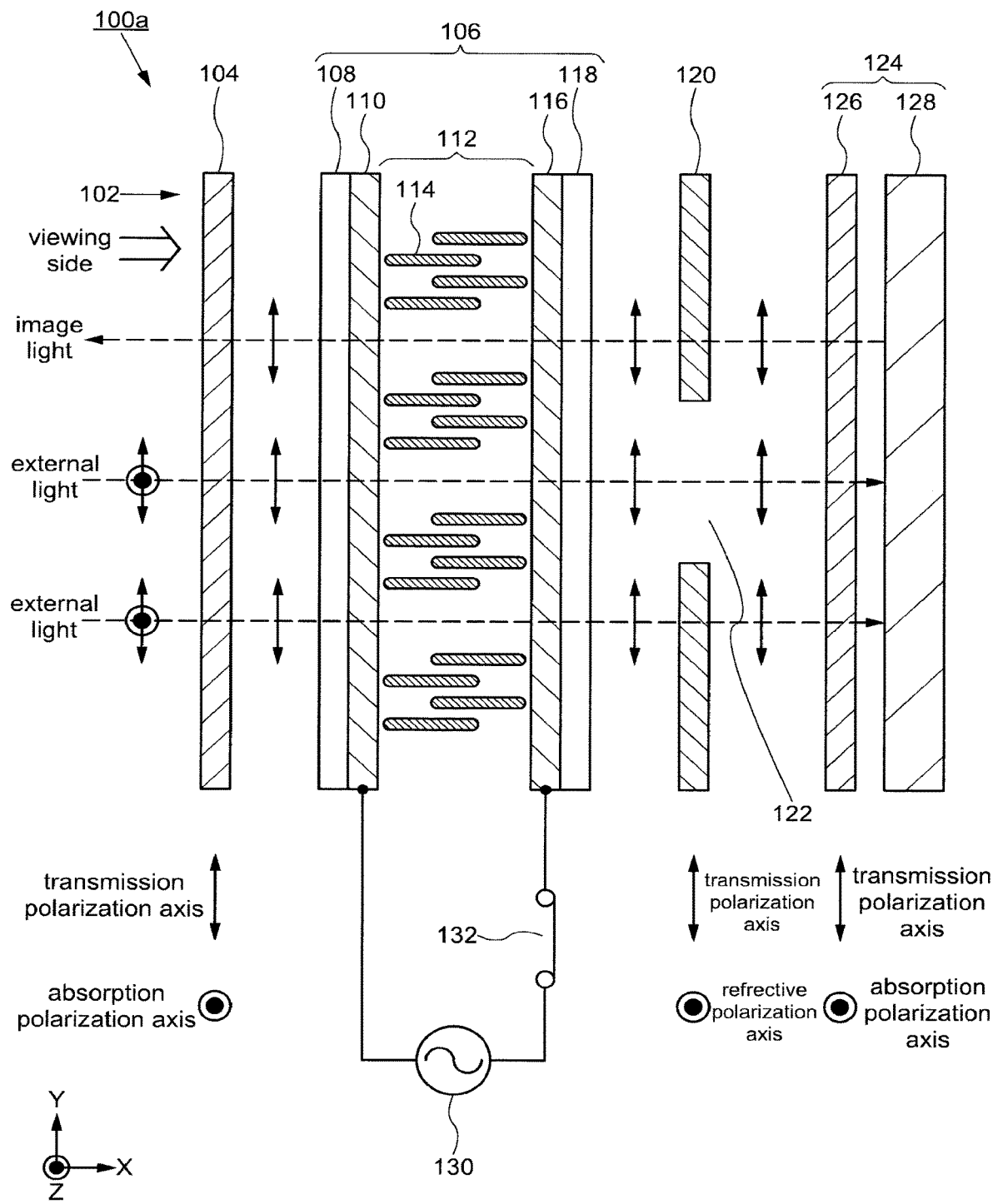
FIG. 2 is a diagram showing a configuration of an electro-optical device according to an embodiment of the present invention and illustrating a case where a display screen is a transparent mode.

FIGS. 1 and 2 show a configuration of an electro-optical device 100a according to an embodiment of the present invention. FIGS. 1 and 2 schematically show the structure of the electro-optical device 100a by a cross-sectional structure. The electro-optical device 100a has a display screen 102 having a flat or curved surface on which images are displayed.

The electro-optical device 100a has a configuration in which an absorption polarization unit 104, a transmission polarization axis conversion unit 106, and a reflective polarization unit 120 are arranged along the third direction from the viewing side of the display screen 102. FIGS. 1 and 2 show the respective units arranged with a gap for the purpose of explanation. In practice, however, each respective unit is arranged close to or closely attached to each other.

The absorption polarization unit 104 transmits linearly polarization component in the first direction (hereinafter, also referred to as a "first linearly polarization component") and absorbs linearly polarization component in the second direction (hereinafter, also referred to as a "second linearly polarization component"). In the absorption polarization unit 104, the direction of linearly polarization, which is the strongest component among the polarization components of the transmitted light, is called a transmission polarization axis. In the absorption polarization unit 104, the direction of linearly polarization, which is the strongest component of the polarization component of the absorbed light, is called an absorption polarization axis. That is, the absorption polarization unit 104 has the transmission polarization axis in the first direction and the absorption polarization axis in the second direction. As shown in FIG. 1, when external light (natural light or artificial illumination light) is incident on the absorption polarization unit 104, the light of the first linearly polarization component is obtained as transmitted light, the light of the second linearly polarization component is absorbed. The absorption polarization unit 104 having such properties is realized by a polarization plate or a polarizing film having an absorbing polarizer.

The transmission polarization axis conversion unit 106 may take at least two states, a state in which the polarization axis of incident light is changed and a state in which the polarization axis is not changed. The transmission polarization axis conversion unit 106 has a configuration in which the two conditions can be switched by an electric action. Specifically, the transmission polarization axis conversion unit 106 may form a state in which the polarization direction of the light linearly polarized in one direction is rotated by 90 degrees and a state in which the light is not rotated. The transmission polarization axis conversion unit 106 having such a function, for example, is realized by using electro-optic effects of the liquid crystal.

The transmission polarization axis conversion unit 106 includes a first substrate 108 provided with a first transparent electrode 110, a second substrate 118 provided with a second transparent electrode 116, and a liquid crystal layer 112. The first substrate 108 and the second substrate 118 are arranged so that the first transparent electrode 110 and the second transparent electrode 116 face each other with a gap therebetween. The liquid crystal layer 112 is arranged in the gap between the first substrate 108 and the second substrate 118. As the first substrate 108 and the second substrate 118, for example, a glass substrate or a resin substrate having flexibility can be used.

The transmission polarization axis conversion unit 106 is connected to a power source 130 to provide a potential difference between the first transparent electrode 110 and the second transparent electrode 116. A switch 132 is also provided to switch turn on and turn off the voltage applied from the power source 130. The power source 130 preferably includes a bipolar power source circuit having a built-in polarity inverting circuit so that the voltage of both the positive and negative electrodes is output.

The first transparent electrode 110 and the second transparent electrode 116 are formed of a transparent conductive film such as ITO (Indium Thin Oxide), IZO (Indium Zinc Oxide). Although not shown in FIG. 1, an alignment film for alignment the liquid crystal is formed on the surfaces of the first transparent electrode 110 and the second transparent electrode 116.

For example, a twisted nematic liquid crystal is used as the liquid crystal layer 112. In the twisted nematic liquid crystal, a liquid crystal molecule 114 is arranged substantially parallel to a main surface of the first substrate 108 and the second substrate 118 between the first transparent electrode 110 and the second transparent electrode 116 when no voltages are applied, and the alignment of the rod-shaped liquid crystal molecule 114 is twisted by 90 degrees. That is, the alignment of the liquid crystal molecule 114 has a state of being twisted by 90 degrees while rotating in one direction little by little from the first transparent electrode 110 to the second transparent electrode 116 in a state where no voltage is applied. As shown in FIG. 2, when a voltage is applied between the first transparent electrode 110 and the second transparent electrode 116, the liquid crystal molecule 114 is aligned in the direction in which an electric field act. The liquid crystal molecule 114 is aligned in the direction approximately perpendicular to the main surface of the first substrate 108 and the second substrate 118.

As shown in FIG. 1, when the light of the first linearly polarization component enters the liquid crystal layer 112 in which the direction of the liquid crystal molecule 114 is twisted by 90 degrees, the polarization direction rotates along the liquid crystal molecule 114. Because the liquid crystal molecule 114 is twisted by 90 degrees, the light transmitted through the liquid crystal layer 112 is substantially converted to the light of the second linearly polarization component. On the other hand, as shown in FIG. 2, even when the light of the first linearly polarization component is incident on the liquid crystal layer 112 which is aligned to the direction approximately perpendicular to the main surface of the first substrate 108 and the second substrate 118, twisting of the liquid crystal molecule 114 is eliminated and the polarization direction of the incident light does not change. As described above, the transmission polarization axis conversion unit 106 can control the state in which the polarization axis is changed and the state in which the polarization axis is not changed when the linearly polarized incident light is transmitted, depending on the application state of the voltage.

The liquid crystal layer 112 is not limited to the twisted nematic liquid crystal. For example, the liquid crystal layer 112 may be a liquid crystal having a negative liquid crystal molecule 114 and initially aligned in the direction approximately perpendicular to the main surface of the first substrate 108 and the second substrate 118. Alternatively, the liquid crystal layer 112 may be a liquid crystal that is homogeneously aligned in the direction approximately parallel to the main surface of the first substrate 108 and the second substrate 118. When the homogeneously aligned liquid crystal is used, in-plane switching (IPS) to drive the liquid crystal molecule 114 with a transverse direction electric field parallel to the main surface, or fringe field switching (FFS) to drive the liquid crystal molecule 114 with a fringe field can be applied to operate the transmission polarization axis conversion unit 106. When the IPS or the FFS is applied, a comb-tooth-shaped first electrode that replaces the first transparent electrode 110 and a comb-tooth-shaped second electrode that replaces the second transparent electrode 116 are provided instead of the first transparent electrode 110 and the second transparent electrode 116 shown in FIGS. 1 and 2. Alternatively, a planar electrode that replaces the first transparent electrode 110 and a comb-shaped electrode that replaces the second transparent electrode are provided sandwiching an insulating layer.

The reflective polarization unit 120 transmits the linearly polarization component in the first direction (the first linearly polarization component) and reflects the linearly polarization component in the second direction (the second linearly polarization component) of the incident light. The polarization direction of the light reflected by the reflective polarization unit 120 is called a reflective polarization axis. In detail, the direction of linearly polarization, which is the strongest component among the polarization components of the light reflected by the reflective polarization unit 120, is called the reflective polarization axis. That is, the reflective polarization unit 120 has the transmission polarization axis in the first direction and the reflective polarization axis in the second direction. The reflective polarization unit 120 having such properties is realized, for example, by a polarization plate having a wire grid polarizer using a metal nanowire or a polarizing film made of a laminated body of a polymer film. The polarization plate with the wire grid polarizer comprises, for example, a polarizer formed of a wire grid, a base material supporting the polarizer, and a protective film. For the polarization film made of the laminated body of the polymer film, for example, a birefringent reflective polarization film having a structure in which a plurality of birefringent polymer films having different birefringence is alternately laminated can be used.

In the present embodiment, the reflective polarization unit 120 has a function of transmitting the light emitted from the transmission polarization axis conversion unit 106 regardless of the polarization direction. That is, it has at least one opening 122 (hereinafter, simply referred to as "opening 122") for transmitting the light of the first linearly polarization component and the light of the second linearly polarization component. Structurally, the opening 122 is at least one region of the reflective polarization unit 120 that does not have a polarization function. In other words, the opening 122 is a region without the reflective polarization axis. In addition, the opening 122 is a region that does not have a reflective function or that has a lower reflectivity than a region other than the opening 122 of the reflective polarization unit 120. That is, the opening 122 is a region in which the incident light to the reflective polarization unit 120 is transmitted without being reflected. In the polarization plate with the wire grid polarizer, the opening 122 is formed by a region in which only the polarizer is not provided. Alternatively, in the polarization plate with the wire grid polarizer, the opening 122 can be formed by a through hole penetrating the base material, the polarizer, and the protective film. In the birefringent reflective polarizing film, the opening 122 is realized by cutting all or a portion of the film to be laminated at a predetermined region.

The size, shape, and range of the opening 122 of the reflective polarization unit 120 can be arbitrarily set. The opening 122 of the reflective polarization unit 120 may be divided into a plurality of regions. For example, the opening 122 of the reflective polarization unit 120 may have a shape representing a particular character, figure, symbol, and the like. The opening 122 may be formed apart from an end portion of the reflective polarization unit 120. That is, the opening 122 may be arranged inside the reflective polarization unit 120. Further, the opening 122 may be arranged in such a manner that a part of the end portion of the reflective polarization unit 120 is missing. The latter form may also be referred to as a defect instead of the opening. In any case, the reflective polarization unit 120 is transmitted through the light of the first linearly polarization component and includes two regions of a region for reflecting the light of the second linearly polarization component and a region for transmitting the light of the first linearly polarization component and the second linearly polarization component.

The display unit 124 may provide on the side of the reflective polarization unit 120 opposite to the transmission polarization axis conversion unit 106. In other words, the reflective polarization unit 120, the transmission polarization axis conversion unit 106, and the absorption polarization unit 104 in front of the display unit 124 may be arranged in this order. The display unit 124 includes a display panel 128. As the display panel 128, a liquid crystal display panel in which each pixel includes a liquid crystal element, an organic electroluminescent display panel in which each pixel is composed of an organic electroluminescent element, a quantum dot display panel including a quantum dot, a micro LED display panel in which each pixel includes an element including a micro-LED, or the like can be applied. When the liquid crystal display panel is used as the display panel 128, a linearly polarization plate is used for a polarization plate 126. For example, the linearly polarization plate having the transmission polarization axis in the first direction and the absorption polarization axis in the second direction is used. That is, a transmission polarization axis of the polarization plate 126, which is the linearly polarization plate and the transmission polarization axis of the reflective polarization unit 120 are arranged parallel or approximately parallel. As the display panel 128, when the organic electroluminescent display panel is used, a circularly polarizing plate is used as the polarization plate 126. In the present embodiment, the display unit 124 is not an indispensable configuration. However, as described below, by providing the display unit 124, images can be displayed on the display screen 102 when the electro-optical device 100a is a transparent mode.

The electro-optical device 100a according to the present embodiment has a configuration in which the absorption polarization unit 104 is arranged on one side (front side) of the transmission polarization axis conversion unit 106 and the reflective polarization unit 120 having the opening 122 is arranged on the other side (rear side). Then, the transmission polarization axis of the absorption polarization unit 104 and the transmission polarization axis of the reflective polarization unit 120 are arranged parallel or approximately parallel. In addition, the absorption polarization axis of the absorption polarization unit 104 and the reflective polarization axis of the reflective polarization unit 120 are arranged parallel or approximately parallel. As described in the following section, the electro-optical device 100*a* has a function of forming two states of a mirror mode and the transparent mode by combining the polarization axes of the absorption polarization unit 104 and the reflective polarization unit 120.

1-2. Operation of Electro-Optical Device

Referring to FIGS. 1 and 2, operation of the electro-optical device 100*a* according to the present embodiment will be described. FIG. 1 shows the state and operation of the electro-optical device 100*a* (hereinafter also referred to as "mirror mode") when no voltage is applied to the transmission polarization axis conversion unit 106, and FIG. 2 shows the state and operation of the electro-optical device 100*a* (hereinafter also referred to as "transparent mode") when a voltage is applied to the transmission polarization axis conversion unit 106.

1-2-1. Mirror Mode

As shown in FIG. 1, the external light incident on the absorption polarization unit 104 from the viewing side, the light of the first linearly polarization component parallel to the transmission polarization axis of the absorption polarization unit 104 is transmitted. The transmission polarization axis conversion unit 106 is in a state where the switch 132 is turn off and no voltage is applied from the power source 130. Therefore, in the transmission polarization axis conversion unit 106, the liquid crystal molecule 114 of the liquid crystal layer 112 is twisted 90 degrees between the first transparent electrode 110 and the second transparent electrode 116. Therefore, the light of the first linearly polarization component, when transmitted through the liquid crystal layer 112, the polarization direction is rotated 90 degrees. Consequently, the transmitted light of the transmission polarization axis conversion unit 106 is converted into the light of the second linearly polarization component.

The light converted into the second linearly polarization component by the transmission polarization axis conversion unit 106 is reflected by the reflective polarization unit 120. The reflected light is incident on the transmission polarization axis conversion unit 106 again. The reflected light of the second linearly polarization component is rotated by 90 degrees when transmitted through the transmission polarization axis conversion unit 106. As a result, the light of the second linearly polarization component is converted into the light of the first linearly polarization component. The absorption polarization unit 104 transmits the light of the first linearly polarization component. Therefore, the external light incident from the absorption polarization unit 104 is reflected by the reflective polarization unit 120 and is emitted to the outside as the reflected light. Thus, the display screen 102 becomes a mirror-state because the incident light from the display screen 102 is reflected by the reflective polarization unit 120 and is emitted from the 102 again as the reflected light. The electro-optical device 100*a* is in the mirror mode when no voltage is applied to the transmission polarization axis conversion unit 106.

When the reflective polarization unit 120 comprises the wire grid polarizer, the hue of the reflected light can be adjusted by providing a highly reflective metallic film on a surface of the wire grid polarizer. For example, by coating the surface of the wire grid polarizer with gold (Au) or titanium nitride (TiN) or the like, the reflected light can be gold color or a hue close to gold color. When the reflective polarization unit 120 is the birefringent reflective polarizing film, the light of any wavelength region can be reflected by appropriately adjusting the thickness of each of the laminated plurality of films. For example, if the wavelength region of the light reflected by the birefringent reflective polarizing film is limited to the short wavelength region, the color of the reflected light can be made blue, and when it is limited to the long wavelength side, the reflected light can be made red. When the wavelength region of the light reflected by the birefringent polarizing film is limited to the wavelength region corresponding to the gold color, the reflected light can be made gold color.

Figure 3A:
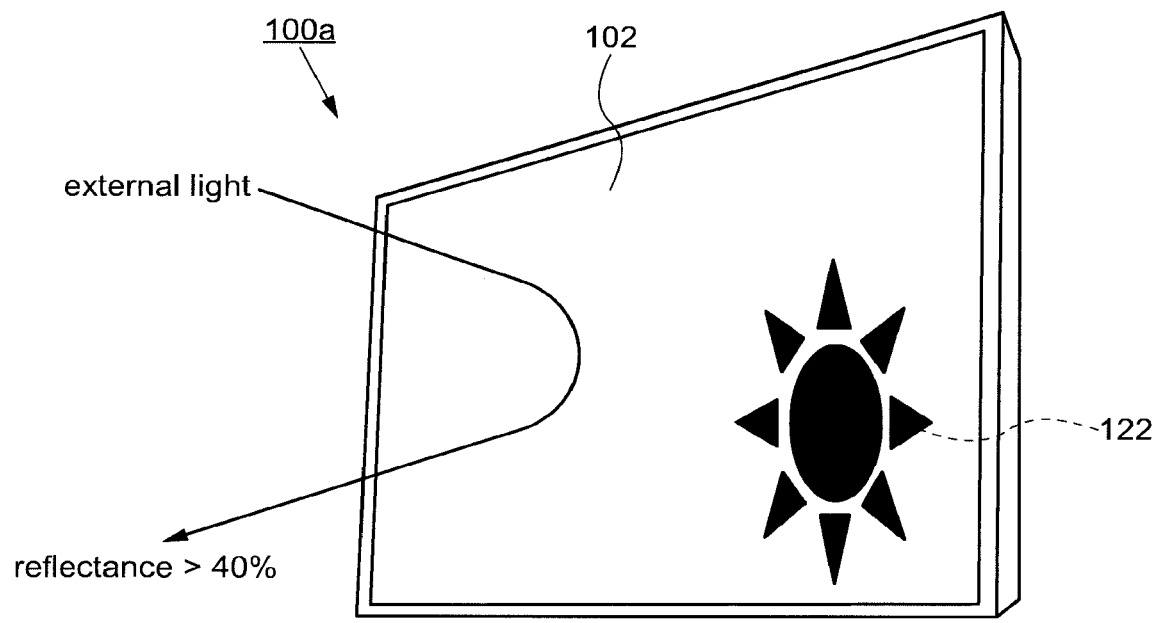
FIG. 3A is a diagram illustrating a state of a display device of an electro-optical device according to an embodiment of the present invention and showing a display screen of a mirror mode.

FIG. 3A shows the state of the display screen 102 of the electro-optical device 100*a* in the mirror mode. In the mirror mode, the display screen 102 of the electro-optical device 100 becomes to look like a mirror by the external light reflecting off at the reflective polarization unit 120. However, since the external light is not reflected in the region in which the opening 122 is provided in the reflective polarization unit 120, it is visible dark when viewing the display screen 102 from the viewing side. The incident light to the display screen 102, although the light of the second linearly polarization component at the absorption polarization unit 104 is absorbed, it is possible to obtain a reflectance of 40% or more for the incident light. As described above, in the electro-optical device 100*a* according to the present embodiment, in the mirror mode, the display screen 102 can be mirrored, and a part of the mirror surface can be set to a non-reflective region to appear dark.

In the mirror mode, even if the image is displayed on the display unit 124 (in other words, even if an image light displaying the image from the display unit 124 is emitted), the image light is mostly absorbed by the absorption polarization unit 104, so the image is hardly visible from the viewing side. Although the first linearly polarization component of the light emitted from the display unit 124 is transmitted through the reflective polarization unit 120, since the polarization direction of the first linearly polarization component is converted into the second direction by the transmission polarization axis conversion unit 106, the most are absorbed by the absorption polarization unit 104 and hardly emitted to the viewing side. When the display panel 128 is the liquid crystal display panel, the light reflected by the polarization plate 126 as shown in FIG. 1 is the light of the first linearly polarization component, transmitted through the reflective polarization unit 120.

Therefore, in the mirror mode, the display screen 102 of the electro-optical device 100*a* is maintained in the mirror mode regardless of whether or not images are displayed by the display unit 124. The image light is a light for displaying images emitted from the display unit 124.

1-2-2. Transparent Mode

As shown in FIG. 2, in the transparent mode, the external light incident on the absorption polarization unit 104 from the viewing side is polarized to the first linearly polarization component parallel to the transmission polarization axis. The transmission polarization axis conversion unit 106 has the switch 132 turned on and in a state that a voltage is applied from the power source 130 between the first transparent electrode 110 and the second transparent electrode 116. In this state, the liquid crystal molecule 114 is aligned in a direction parallel to the electric field. Therefore, the light of the first linearly polarization component incidents on the transmission polarization axis conversion unit 106, the polarization direction is not changed, transmits the transmission polarization axis conversion unit 106 with the polarization direction maintained.

Since the transmission polarization axis of the reflective polarization unit 120 is arranged parallel to the first direction, the light of the first linearly polarization component transmitted through the transmission polarization axis conversion unit 106 is transmitted through the reflective polarization unit 120. Similarly, the opening 122 of the reflective polarization unit 120, the light of the first linearly polarization component transmitted through the transmission polarization axis conversion unit 106 is transmitted. Therefore, in the transparent mode, the mirror-state of the display screen 102 is eliminated and the transmission state is obtained. When the display screen 102 is transparent, the presence or absence of the opening 122 is not visually recognized, and the opening 122 provided on the reflective polarization unit 120 has little effect on the optical property.

Figure 3B:
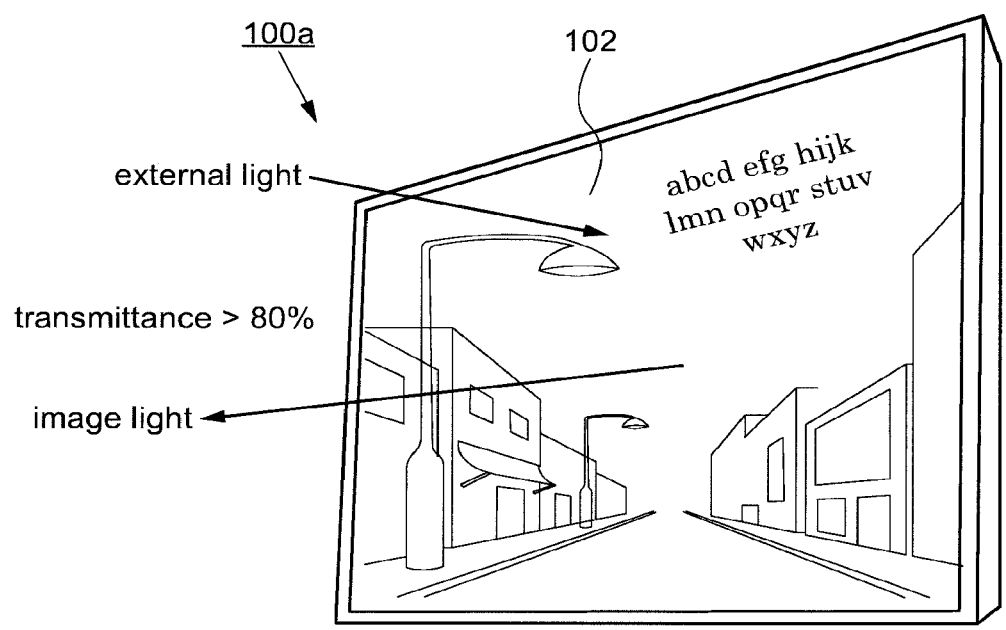
FIG. 3B is a diagram illustrating a state of a display device of an electro-optical device according to an embodiment of the present invention and showing a display screen of a transparent mode.

FIG. 3B shows the state of the display screen 102 of the electro-optical device 100a in the transparent mode. In the transparent mode, when the display unit 124 is activated, images are displayed on the display screen 124. For example, when the display panel 128 is a liquid crystal display panel, the light emitted from the display panel 128 becomes the light of the first linearly polarization component by the action of the polarization plate 126. Since the transmission polarization axis of the absorption polarization unit 104 and the reflective polarization unit 120 are arranged in parallel, and the transmission polarization axis conversion unit 106 is free from the twist of the liquid crystal molecule 114, the light of the first linearly polarization component emitted from the display unit 124 is emitted to the viewing side. Thus, in the transparent mode, the image displayed on the display unit 124 can be viewed in the display screen 102. The image light emitted from the display unit 124 is slightly attenuated by passing through the reflective polarization unit 120, the liquid crystal layer 112, and the absorption polarization unit 104. However, 80% or more can be realized as the transmittance through the whole of the reflective polarization unit 120, the liquid crystal layer 112, and the absorption polarization unit 104. Thus, degradation of the image quality of the image displayed on the display unit 124 is hardly a problem.

On the other hand, when the display unit 124 is stopped, the reflectivity of the display panel is low due to the effects of color filters and the like. When the polarization plate 126 is the circularly polarizing plate, the reflectivity is similarly low. Thus, the reflection of the external light at the display unit 124 is extremely low, and the display screen 102 is not in the mirror-state, and a visually black state is formed.

According to the present embodiment, the electro-optical device 100a can be switched between the mirror mode and the transparent mode by controlling the polarization directions of the light transmitted through the transmission polarization axis conversion unit 106 by the transmission polarization axis conversion unit 106. In the transparent mode, the image displayed by the display unit 124 may be displayed on the display screen 102. In the mirror mode, the opening 122 allows a part of the display screen 102 to be displayed with a region having different contrasts. The electro-optical device 100a can display characters, images, patterns, and the like in the mirror mode by using the region having different contrast of the display screen 102. With this function, the electro-optical device 100a can display characters, images, patterns, and the like on the display screen 102 even when the display unit 124 does not display an image and can provide design property as an interior. As described above, according to the present embodiment, even when the image output by the display unit 124 is not displayed on the display screen 102, it is possible to display a still image suitable for the surrounding environments.

In the configuration of the electro-optical device 100a shown in FIGS. 1 and 2, the reflective polarization unit 120 provided with the opening 122 may be replaceable. The interchangeability of the reflective polarization unit 120 permits a change in the form of the non-reflective region. Therefore, characters, images, patterns, and the like displayed on the display screen 102 in the mirror mode using the region having different contrasts can be changed as appropriate.

Figure 5:
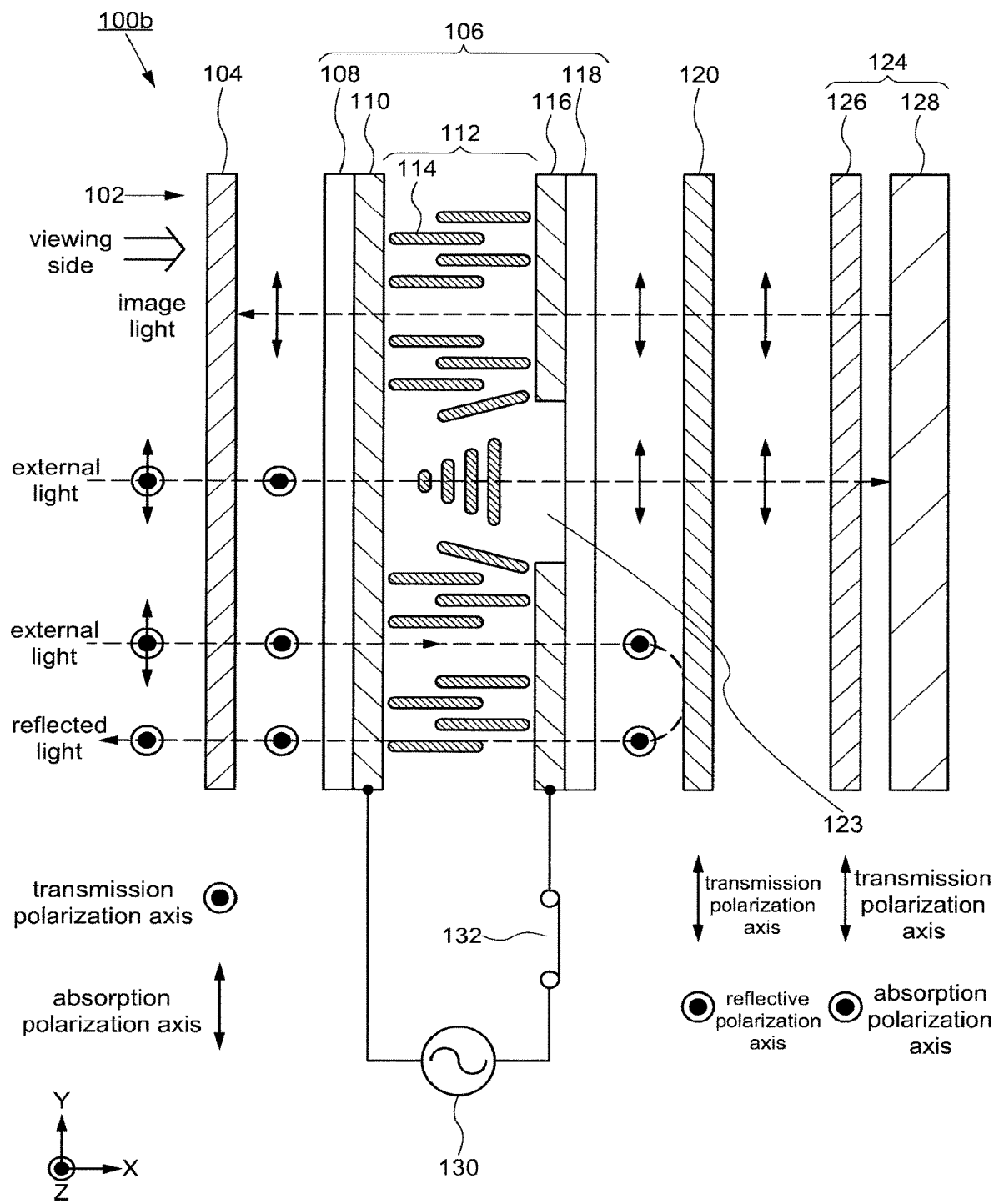
FIG. 5 is a diagram showing a configuration of an electro-optical device according to an embodiment of the present invention and illustrating a case where a display screen is a mirror mode.

Second Embodiment 2-1. Configuration of Electro-Optical Device
2-1-1. A First Example of an Arrangement A configuration of an electro-optical device 100b according to an embodiment of the present invention will be described with reference to FIGS. 4 and 5. The electro-optical device 100b has the display screen 102 having a flat or curved surface on which images are displayed. FIGS. 4 and 5 schematically show the configuration of the electro-optical device 100b by a cross-sectional structure. In the following description, a part different from the first embodiment will be mainly described.

The electro-optical device 100b has a configuration in which the absorption polarization unit 104, the transmission polarization axis conversion unit 106, and the reflective polarization unit 120 are arranged along the third direction from the viewing side of the display screen 102.

The absorption polarization unit 104 is arranged so as to have the transmission polarization axis in the second direction and the absorption polarization axis in the first direction. The absorption polarization unit 104 transmits the light of the second linearly polarization component and absorbs the light of the first linearly polarization component. As shown in FIG. 4, when the external light (natural light or artificial illumination light) is incident on the absorption polarization unit 104, the light of the second linearly polarization component is obtained as the transmitted light, the light of the first linearly polarization component is absorbed.

Similar to the first embodiment, the transmission polarization axis conversion unit 106 includes the first substrate 108 provided with the first transparent electrode 110, the second substrate 118 provided with the second transparent electrode 116, and the liquid crystal layer 112. A difference from the first embodiment is in the configuration of the first transparent electrode 110 and the second transparent electrode 116. In the second embodiment, at least one opening 123 (hereinafter, simply referred to as "opening 123") is provided on one of the first transparent electrode 110 and the second transparent electrode 116. FIG. 4 shows an embodiment in which the opening 123 is provided on the second transparent electrode 116. The opening 123 may be provided on the first transparent electrode 110. In other words, the electro-optical device 100b has a region in which at least one of the first transparent electrode 110 and the second transparent electrode 116 does not overlap with the liquid crystal layer 112 in a plan view.

As shown in FIG. 4, in a state where no voltage is applied to the transmission polarization axis conversion unit 106, the liquid crystal molecule 114 included in the liquid crystal layer 112 is continuously twisted 90 degrees. Since the alignment film (not shown) is also provided in the opening 123, the liquid crystal molecule 114 is aligned in the same manner as in the other region. Therefore, when the light of the second linearly polarization component is transmitted through the liquid crystal layer 112, the polarization direction rotates in the first direction and is converted into the first linearly polarization component.

On the other hand, as shown in FIG. 5, when a voltage is applied to the transmission polarization axis conversion unit 106, the liquid crystal molecule 114 is untwisted and aligned in a direction parallel to the direction of the electric field. Therefore, the light of the second linearly polarization component is transmitted through the transmission polarization axis conversion unit 106. However, in the region provided with the opening 123, no electric field is generated and the liquid crystal molecule 114 is maintained in a twisted state. Light passing through this region rotates the polarization axis and is converted into the light of the first linearly polarization component. Thus, the transmission polarization axis conversion unit 106 has the region that changes the polarization direction of the transmitted light when a voltage is applied, and the region that does not change the polarization direction of the transmitted light.

The size, shape, and range of the opening 123 provided on one of the first transparent electrode 110 and the second transparent electrode 116 can be arbitrarily set. The at least one opening 123 may consist of a plurality of openings For example, the opening 123 provided on one of the first transparent electrode 110 and the second transparent electrode 116 may be provided to represent a particular character, figure, symbol, or the like. The opening 123 may be provided apart from an end portion of the transparent electrode (the first transparent electrode 110 or the second transparent electrode 116). In other words, the opening 123 may be provided inside the transparent electrode (the first transparent electrode 110 or the second transparent electrode 116). The opening 123 may be provided in such a manner that a part of the end portion of the transparent electrode (the first transparent electrode 110 or the second transparent electrode 116) is missing. The latter form may also be referred to as a defect instead of the opening.

The reflective polarization unit 120 has the transmission polarization axis in the first direction and the reflective polarization axis in the second direction. The reflective polarization unit 120 transmits the light of the first linearly polarization component and reflects the light of the second linearly polarization component. Thus, in the present embodiment, the transmission polarization axis is arranged so as to be orthogonal to the absorption polarization unit 104 and the reflective polarization unit 120.

In the electro-optical device 100b according to the present embodiment, the opening 123 is provided in one of the first transparent electrode 110 and the second transparent electrode 116 constituting the transmission polarization axis conversion unit 106. With such a configuration, it is possible to provide a region in which the alignment of the liquid crystal molecule 114 does not change even when a voltage is applied to the transmission polarization axis conversion unit 106. As shown in FIG. 5, in the present embodiment, a state of applying a voltage to the transmission polarization axis conversion unit 106 is turned the mirror mode. The above-described region of not changing the polarization directions of the transmitted light can be used to display a region having different contrasts on a part of the display screen 102 in the mirror mode.

2-1-2. A Second Example of an Arrangement

Figure 6:
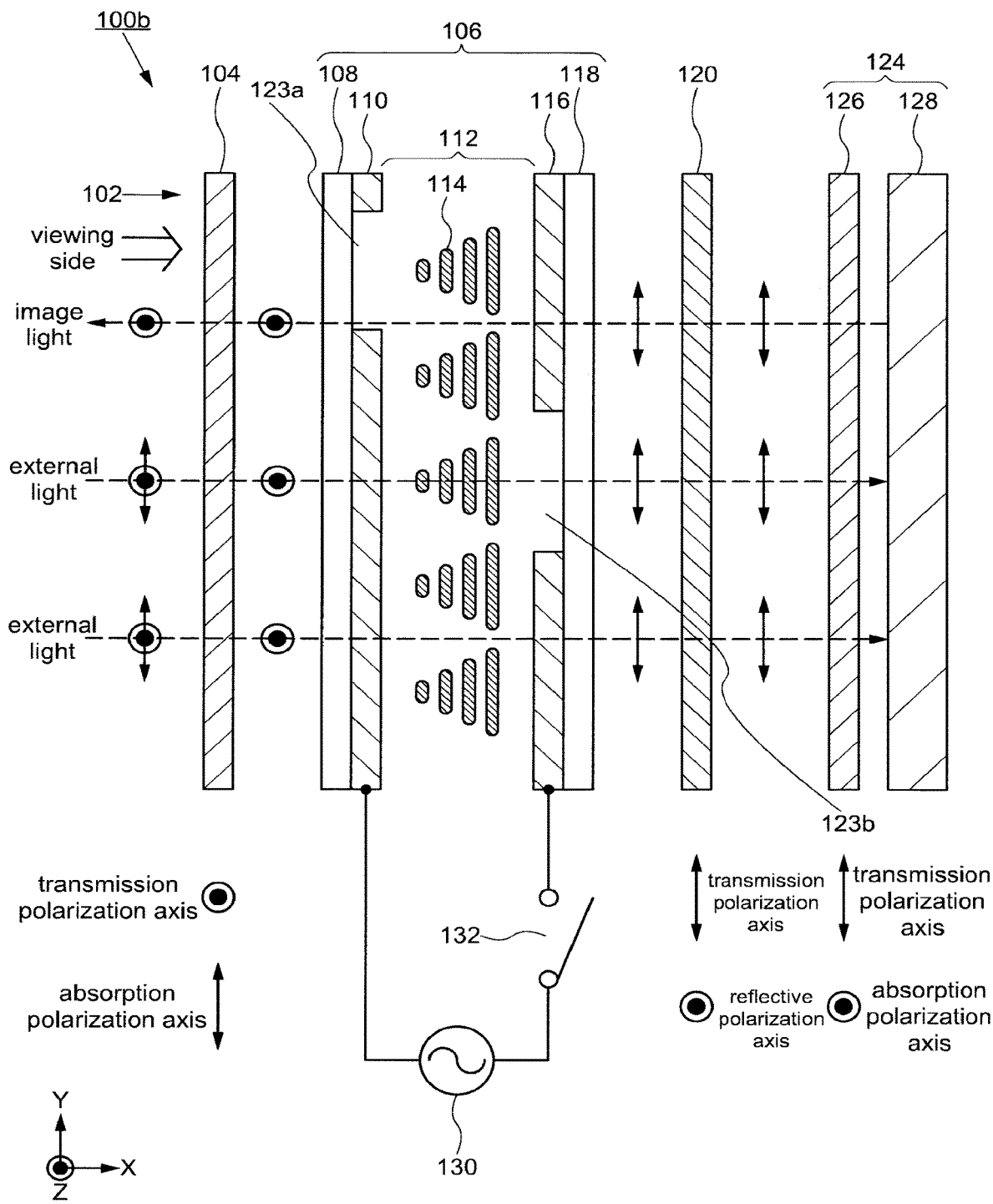
FIG. 6 is a diagram showing a configuration of an electro-optical device according to an embodiment of the present invention and illustrating a case where a display screen is a transparent mode.

As shown in FIG. 6, a first openings 123a and a second openings 123b may be provided on both the first transparent electrode 110 and the second transparent electrode 116. For example, the first opening 123a may be provided on the first transparent electrode 110, and the second opening 123b may be provided on the second transparent electrode 116. The first opening 123a and the second opening 123b may be arranged so as to overlap each other. As shown in FIG. 6, the first opening 123a and the second opening 124b may be arranged in a different region (in a region where they do not overlap with each other in a plan view). In any case, by providing the first opening 123a and the second opening 123b, it is possible to provide a region that does not change the alignment of the liquid crystal molecule 114.

2-2. Operation of Electro-Optical Device

Figure 7:
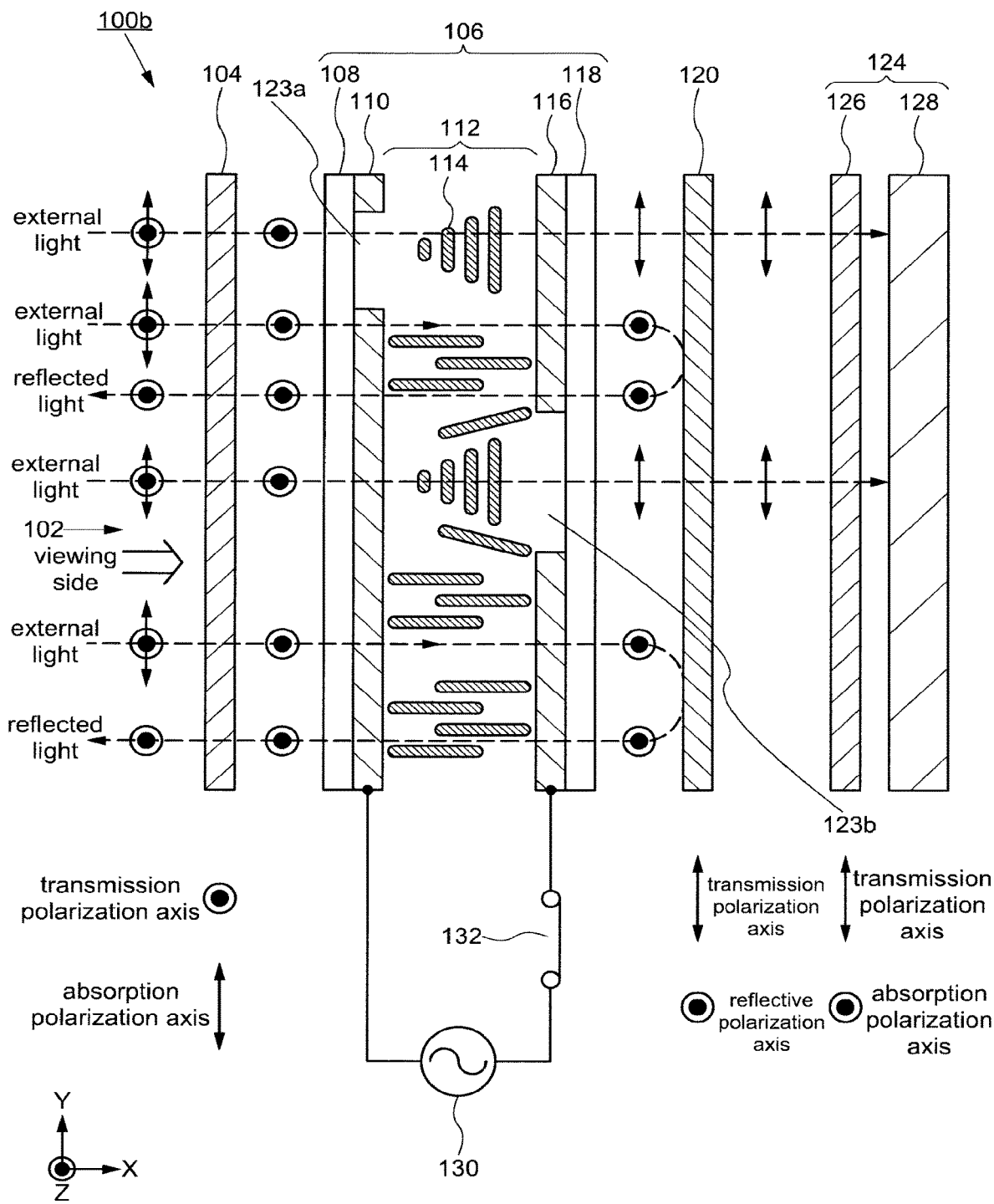
FIG. 7 is a diagram showing a configuration of an electro-optical device according to an embodiment of the present invention and illustrating a case where a display screen is a mirror mode.

Referring to FIGS. 4 to 7, the operation of the electro-optical device 100b according to the present embodiment will be described. FIGS. 4 and 6 show the state of the electro-optical device 100b when no voltage is applied to the transmission polarization axis conversion unit 106 and the operation (the transparent mode), and FIGS. 5 and 7 show the state and the operation (the mirror mode) of the electro-optical device 100b when a voltage is applied to the transmission polarization axis conversion unit 106.

2-2-1. Transparent Mode

As shown in FIGS. 4 and 6, when the voltage is not applied to the transmission polarization axis conversion unit 106, the external light incident on the absorption polarization unit 104 from the viewing side, the light parallel to the transmission polarization axis (the second linearly polarization component) is transmitted. Since the transmission polarization axis conversion unit 106 is in a state in which the switch 132 turn off and no voltage applied from the power source 130, the liquid crystal molecule 114 of the liquid crystal layer 112 is twisted by 90 degrees between the first transparent electrode 110 and the second transparent electrode 116. Therefore, the light of the second linearly polarization component, when transmitted through the liquid crystal layer 112, the polarization direction is rotated 90 degrees. Consequently, the light of the second linearly polarization component passing through the transmission polarization axis conversion unit 106 is converted into the light of the first linearly polarization component.

The transmission polarization axis of the reflective polarization unit 120 is arranged in the first direction. Therefore, the light of the first linearly polarization component converted by the transmission polarization axis conversion unit 106 is transmitted through the reflective polarization unit 120. Furthermore, when the display panel 128 is a liquid crystal display panel, the incident light to the polarization plate 126 reaches the display panel 128 because the transmission polarization axis faces the first direction. Since the display panel 128 has a low reflectance due to influences of color filters and the like, the external light is hardly reflected by the display unit 124. Similarly, the external light is hardly reflected at the display unit 124 when the polarization plate 126 is the circularly polarizing plate.

When the display unit 124 is driven, the image light is emitted. When the display panel 128 is a liquid crystal display panel, the image light emitted from the display panel 128 is converted into the light of the first linearly polarization component by the action of the polarization plate 126. Since the transmission polarization axis of the polarization plate 126 and the reflective polarization unit 120 are arranged in parallel, emitted light of the display panel 128 is transmitted through the reflective polarization unit 120. Since the liquid crystal molecule 114 is twisted in the transmission polarization axis conversion unit 106, the light of the first linearly polarization component is converted into the light of the second linearly polarization component. Since the transmission polarization axis of the absorption polarization unit 104 is arranged in the second direction, the light passing through the transmission polarization axis conversion unit 106 and converted into the second linearly polarization component is transmitted through the absorption polarization axis 104. The light passing through the absorption polarization unit 104 is emitted from the display screen 102. As a result, images displayed on the display panel 128 can be visually recognized from the viewing side.

Thus, the electro-optical device 100b according to the present embodiment is turned the transparent mode without applying a voltage to the transmission polarization axis conversion unit 106. In the transparent mode, when the display unit 124 is activated, images can be displayed on the display screen 102. In this case, even if the opening 123 is provided on one of the first transparent electrode 110 and the second transparent electrode 116, the displayed image is hardly affected.

2-2-2. Mirror Mode

As shown in FIGS. 5 and 7, when a voltage is applied to the transmission polarization axis conversion unit 106, the liquid crystal molecule 114 is aligned toward the electric field except for the region of the opening 123 (the first opening 123a and the second opening 123b in FIG. 7). In this state, the light of the second linearly polarization component that has passed through the absorption polarization unit 104 passes through a region in which the polarization direction does not rotate in the transmission polarization axis conversion unit 106 and a region in which the polarization direction rotates. That is, since the liquid crystal molecule 114 in the region where both the first transparent electrode 110 and the second transparent electrode 116 are provided is aligned in the direction of the electric field, the polarization direction of the transmitted light is not rotated. On the other hand, in the region in which the opening 123 (the first opening 123a and the second opening 123b in FIG. 7) is provided, the liquid crystal molecule 114 is aligned in a twisted state, so that the light of the second linearly polarization component is converted into the light of the first linearly polarization component.

In the reflective polarization unit 120, since the reflective polarization axis is arranged in the second direction, the light of the second linearly polarization component transmitted through the transmission polarization axis conversion unit 106 is reflected. The reflected light of the second linearly polarization component is transmitted through the transmission polarization axis conversion unit 106 without changing the polarization direction. Furthermore, the reflected light is transmitted through the absorption polarization unit 104 and emitted from the display screen 102 because the transmission polarization axis is arranged in the second direction in the absorption polarization unit 104. Thus, the electro-optical device 100b realizes the mirror mode in a state where a voltage is applied to the transmission polarization axis conversion unit 106.

On the other hand, in a region in which the opening 123 (the first opening 123a and the second opening 123b in FIG. 7) is provided in the transmission polarization axis conversion unit 106, the light transmitted through the transmission polarization axis conversion unit 106 is transmitted through the reflective polarization unit 120 similarly to the transparent mode. Therefore, no reflected light is obtained by the region of the opening 123 (the first opening 123a and the second opening 123b in FIG. 7). As a result, in the mirror mode, the region provided with the opening 123 (the first opening 123a and the second opening 123b in FIG. 7) is visually recognized darker than the other region. In the mirror mode, a region having different contrasts is displayed on a part of the display screen 102. The electro-optical device 100b can display characters, images, patterns, and the like in the display screen 102 of the mirror mode using the region having different contrasts. As shown in FIG. 5, the image light output by the display unit 124 is absorbed and blocked by the absorption polarization unit 104 in a region where both the first transparent electrode 110 and the second transparent electrode 116 are provided. The image light output by the display unit 124 is transmitted through the absorption polarization unit 104 in the region where the opening 123 is provided. Therefore, the predetermined light (the image light) is output from the display unit 124 in the mirror mode, it is also possible to emit the light from the display screen 102 at the region where the opening 123 is provided (also referred to as a non-mirror region). In FIG. 7, the image light output by the display unit 124 is omitted but is the same as in FIG. 5.

According to the present embodiment, the electro-optical device 100a can be switched between the mirror mode and the transparent mode by controlling the polarization directions of the light transmitted through the transmission polarization axis conversion unit 106 by the transmission polarization axis conversion unit 106. In the transparent mode, the images output by the display unit 124 can be displayed on the display screen 102. In the mirror mode, the region provided with the opening 123 described above can be used to display the region having different contrasts on a part of the display screen 102. The electro-optical device 100b is capable of displaying characters, images, patterns, and the like in the mirror mode using the region having different contrasts of the display screen 102. The electro-optical device 100b can display characters, images, patterns, and the like on the display screen 102 even when the image of the display unit 124 is not displayed on the display screen 102 and can have design property as an interior. As described above, according to the present embodiment, it is possible to display a still image to be compatible with the surrounding environments even when the image output by the display unit 124 is not displayed on the display screen 102 and not viewed.

Third Embodiment 3-1. Configuration of Electro-Optical Device

Figure 8:
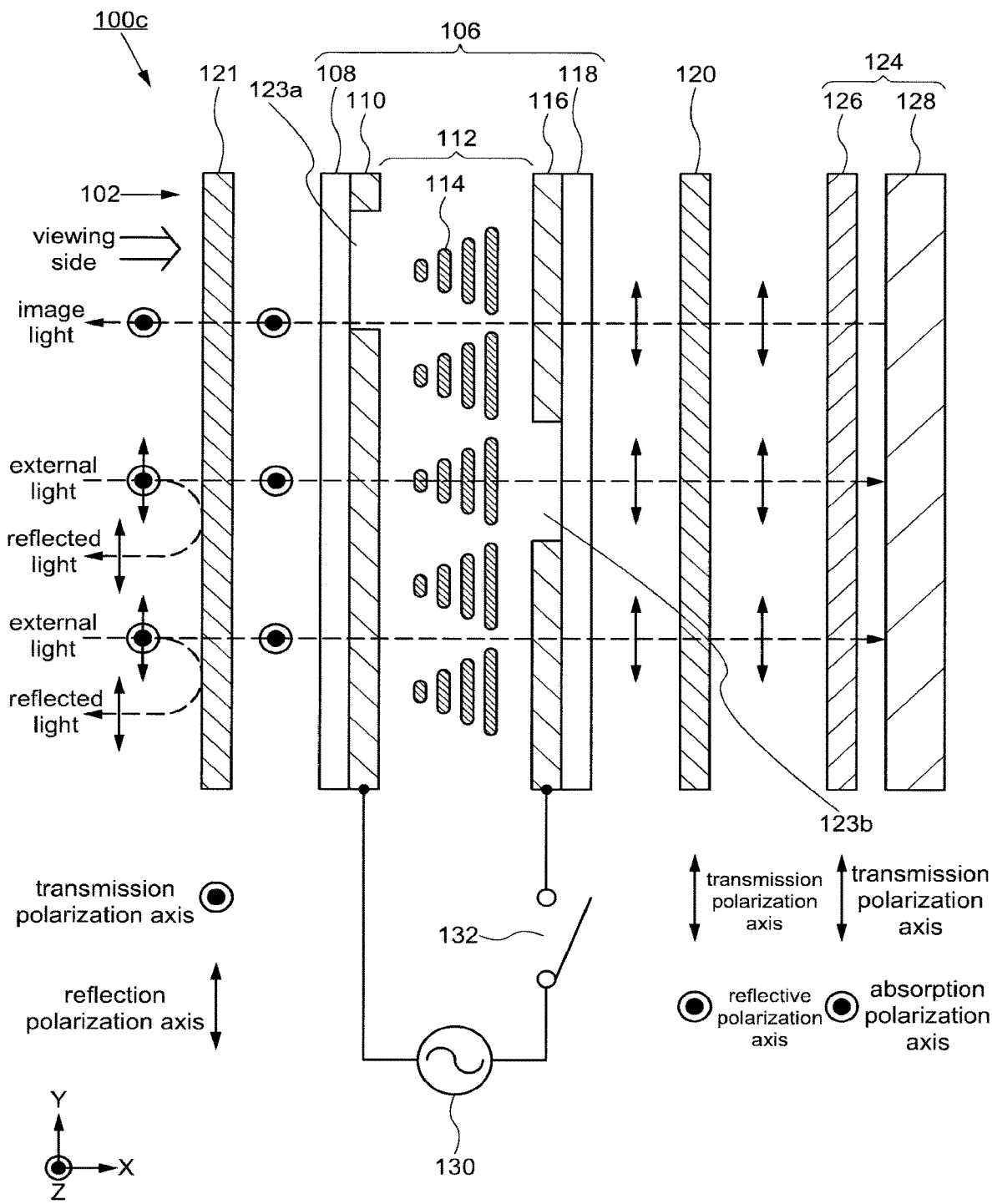
FIG. 8 is a diagram showing a configuration of an electro-optical device according to an embodiment of the present invention and illustrating a case where a display screen is a transparent mode.

A configuration of an electro-optical device 100c according to an embodiment of the present invention will be described with reference to FIGS. 8 and 9. FIG. 8 schematically shows the structure of the electro-optical device 100c by a cross-sectional structure. The electro-optical device 100c has a configuration in which a first reflective polarization unit 121, the transmission polarization axis conversion unit 106, and a second reflective polarization unit 120 are arranged along the third direction from the viewing side of the display screen 102.

The first reflective polarization unit 121 is arranged to have the transmission polarization axis in the second direction and the reflective polarization axis in the first direction. The first reflective polarization unit 121 transmits the second linearly polarization component and reflects the first linearly polarization component.

The transmission polarization axis conversion unit 106 has the same configuration as the second embodiment. Also, in the present embodiment, an opening is provided on one or both of the first transparent electrode 110 and the second transparent electrode 116. FIG. 8 shows a mode in which the first opening 123a is provided on the first transparent electrode 110 and the second opening 123b is provided on the second transparent electrode 116.

The second reflective polarization unit 120 has the transmission polarization axis in the first direction and the reflective polarization axis in the second direction. The reflective polarization unit 120 reflects the light of the second linearly polarization component is transmitted through the light of the first linearly polarization component. In the present embodiment, the transmission polarization axis is arranged to be orthogonal to the first reflective polarization unit 121 and the second reflective polarization unit 120.

FIG. 8 shows a configuration in which, in the transmission polarization axis conversion unit 106, both the first transparent electrode 110 and the second transparent electrode 116 have the opening. Instead of the configuration shown in FIG. 8, the configuration shown in FIG. 4 may be applied to the electro-optical device 100c according to the present embodiment. That is, in the electro-optical device 100c, a configuration in which the opening is provided in one of the first transparent electrode 110 and the second transparent electrode 116 can be applied.

3-2. Operation of Electro-Optical Device

An operation of the electro-optical device 100c according to the present embodiment will be described with reference to FIGS. 8 and 9. FIG. 8 shows the state and the operation (the transparent mode) when no voltage is applied to the transmission polarization axis conversion unit 106, and FIG. 9 shows the state and the operation (the mirror mode) when a voltage is applied to the transmission polarization axis conversion unit 106.

3-2-1. Transparent Mode

As shown in FIG. 8, when no voltage is applied to the transmission polarization axis conversion unit 106, among the external light incident on the first reflective polarization unit 121 from the viewing side, the light parallel to the transmission polarization axis transmits through, and the light of the second linearly polarization component incidents on the transmission polarization axis conversion unit 106. On the other hand, the light of the polarization component in the first direction is reflected by the reflective polarization unit 120.

Because the switch 132 is turn off, the transmission polarization axis conversion unit 106 is in a state where no voltage is applied from the power source 130. Therefore, the light of the second linearly polarization component, when transmitted through the liquid crystal layer 112, the polarization direction is rotated 90 degrees, is converted into the light of the first linearly polarization component.

The transmission polarization axis of the second reflective polarization unit 120 is arranged in the first direction. Therefore, the light of the first linearly polarization component converted by the transmission polarization axis conversion unit 106 passes through the second reflective polarization unit 120. When the display panel 128 is a liquid crystal display panel, the incident light from the display screen 102 passes through the polarization plate 126 to the display panel 128 because the transmission polarization axis faces in the first direction. Since the display panel 128 is less reflective due to the effects of color filters and the like, the reflections at the display panel 128 are less reflective and negligible than the reflected light of the first reflective polarization unit 121. When the polarization plate 126 is the circularly polarizing plate, the display panel 128 reflections are negligible.

When the display unit 124 is driven, the light of the first linearly polarization component is emitted from the display panel 128 by the action of the polarizing plate 126. Since the transmission polarization axis of the polarization plate 126 and the second reflective polarization unit 120 are arranged in parallel, the emitted light from the display panel 128 is transmitted through the second 120. Since the liquid crystal molecule 114 is twisted in the transmission polarization axis conversion unit 106, the light of the first linearly polarization component is converted into the light of the second linearly polarization component. Since the transmission polarization axis of the first reflective polarization unit 121 is arranged in the second direction, the light that has been converted into the second linearly polarization component transmitted through the transmission polarization axis conversion unit 106 is transmitted through the first reflective polarization unit 121 and is emitted from the display screen 102. As a result, the images displayed on the display panel 128 can be visually recognized from the viewing side.

Figure 10A:
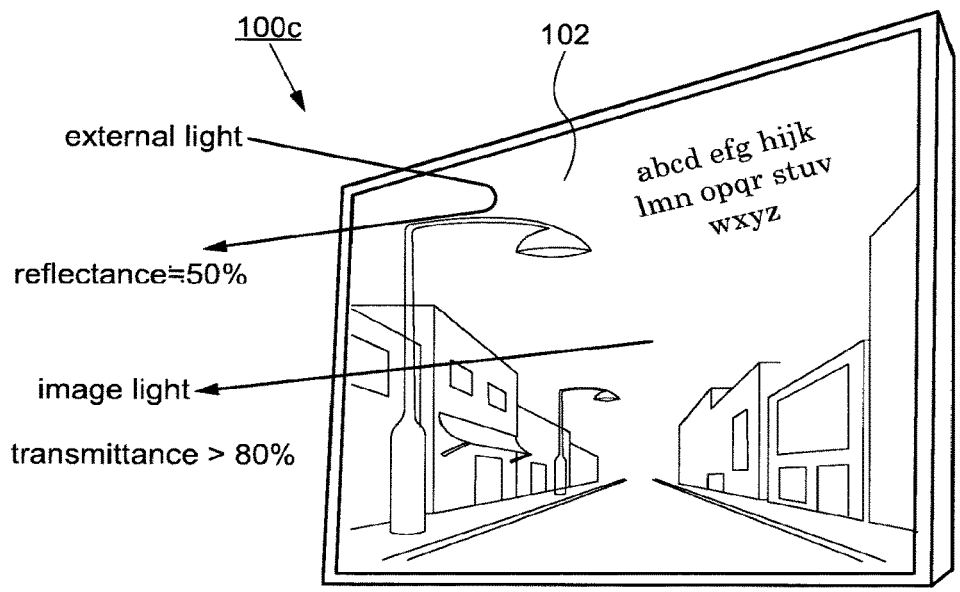
FIG. 10A is a diagram illustrating a state of a display screen of an electro-optical device according to an embodiment of the present invention and showing a display device of a transparent mode.

FIG. 10A shows the state of the display screen 102 of the electro-optical device 100c in the transparent mode. When the display panel 128 is a liquid crystal display panel, in the transparent mode, the light emitted from the display panel 128 becomes the light of the first linearly polarization component by the action of the polarization plate 126. The transmission polarization axis of the first reflective polarization unit 121 and the second reflective polarization unit 120 are arranged orthogonally. Since the liquid crystal molecule 114 of the transmission polarization axis conversion unit 106 is twisted by 90 degrees, the light of the first linearly polarization component emitted from the display panel 128 and transmitted through the second reflective polarization unit 120 is converted into the light of the second linearly polarization component. Thus, in the transparent mode, the images displayed on the display unit 124 can be viewed in the display screen 102.

The image light emitted from the display unit 124, although slightly attenuated by passing through the second reflective polarization unit 120, the liquid crystal layer 112, and the first reflective polarization unit 121, it is possible to realize 80% or more as the transmittance. The second reflective polarization unit 120 reflects the light of the polarization component in the first direction, but the reflectivity of the second external light 120 to the external light is about 50%, and there is a little effect of the external light reflection when viewing the image displayed on the display panel 128 from the viewing side at the transparent mode.

3-2-2. Mirror Mode

Figure 9:
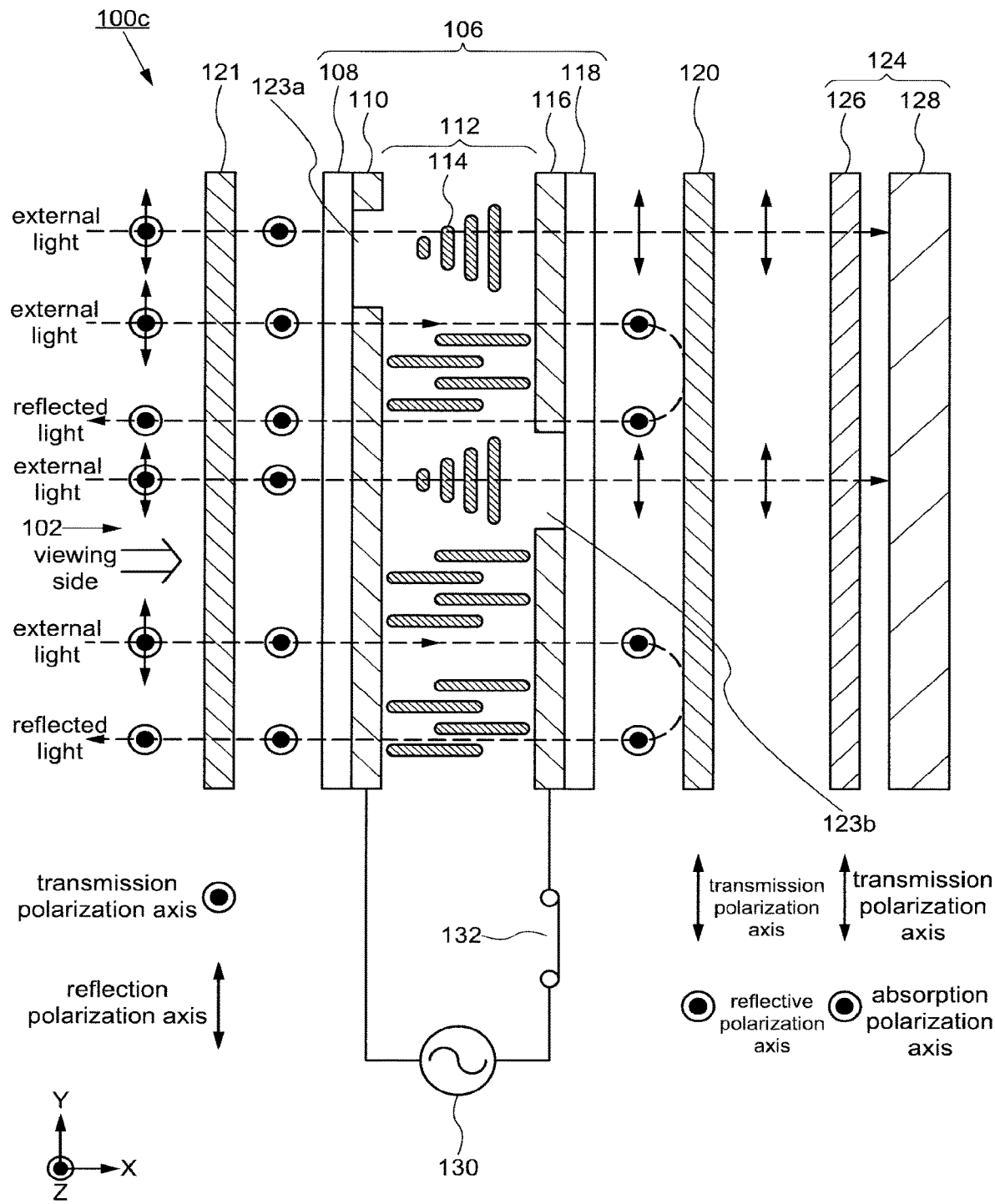
FIG. 9 is a diagram showing a configuration of an electro-optical device according to an embodiment of the present invention and illustrating a case where a display screen is a mirror mode.

As shown in FIG. 9, when a voltage is applied to the transmission polarization axis conversion unit 106, the liquid crystal molecule 114 is aligned toward the electric field except for the region of the first opening 123a and the second opening 123b. In this state, the light of the second linearly polarization component that has passed through the first reflective polarization unit 121 passes through both region in which the polarization direction does not rotate and the region in which the polarization direction rotates in the transmission polarization axis conversion unit 106. Since the liquid crystal molecule 114 of the region provided with both the first transparent electrode 110 and the second transparent electrode 116 is aligned toward the electric field, the polarization axes of the transmitted light are not rotated. On the other hand, in the region in which the first opening 123a and the second opening 123b are provided, since the liquid crystal molecule 114 is aligned in a twisted state, the light of the second linearly polarization component is converted into the light of the first linearly polarization component. In FIG. 9, the light in which the external light is reflected by the first reflective polarization unit 121 (the light of the first linearly polarization component, the reflected light), and the image light output by the display unit 124 is omitted. The operation of the image light output by the display unit 124 in FIG. 9 is the same as that in FIG. 5.

The second reflective polarization unit 120, since the reflective polarization axis is arranged in the second direction, the light of the second linearly polarization component transmitted through the transmission polarization axis conversion unit 106 is reflected by the second reflective polarization unit 120. The reflected light of the second linearly polarization component is transmitted through the transmission polarization axis conversion unit 106 without changing the polarization direction. Since the transmission polarization axis is arranged in the second direction of the first reflective polarization unit 121, the reflected light transmitted through the transmission polarization axis conversion unit 106 is transmitted through the first reflective polarization unit 121 and emitted from the display screen 102. In this manner, the electro-optical device 100c realizes the mirror mode in a state that a voltage is applied to the transmission polarization axis conversion unit 106.

On the other hand, in the region in which the first opening 123a and the second opening 123b are provided in the transmission polarization axis conversion unit 106, the light transmitted through the transmission polarization axis conversion unit 106 is transmitted through the second reflective polarization unit 120 similarly to the transparent mode. Therefore, the reflected light is not obtained by the region of the first opening 123a and the second opening 123b. As a result, in the mirror mode, the region provided with the first opening 123a and the second opening 123b is visually recognized darker than the other region.

Figure 10B:
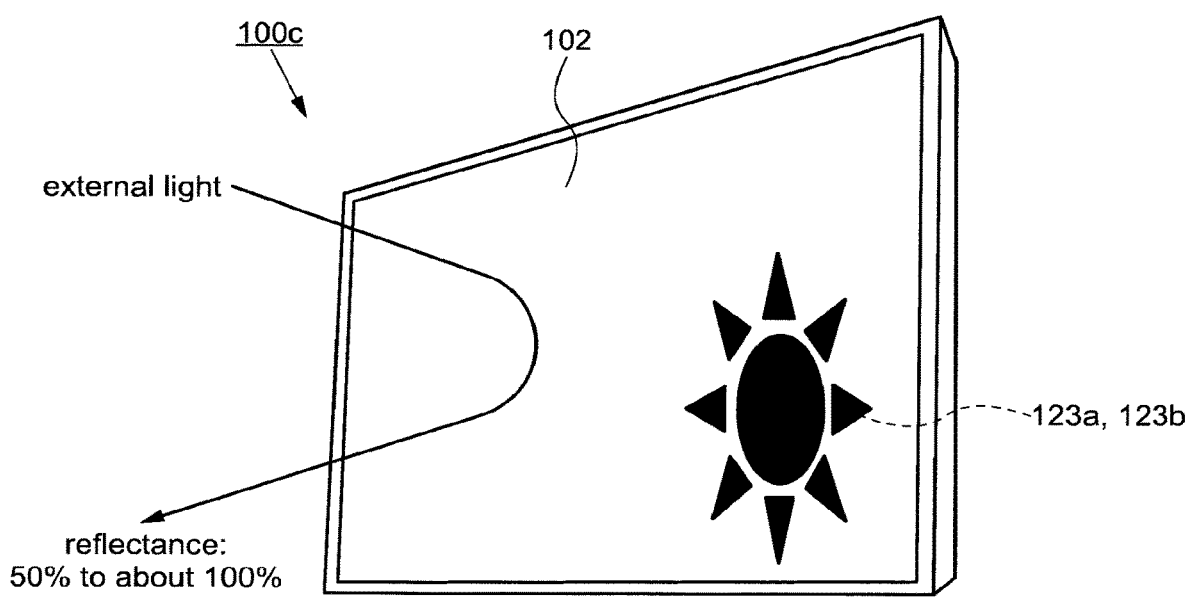
FIG. 10B is a diagram illustrating a state of a display device of an electro-optical device according to an embodiment of the present invention and showing a display device of a mirror mode.

FIG. 10B shows the state of the display screen 102 of the electro-optical device 100c in the mirror mode. In the mirror mode, by the external light is reflected by the first reflective polarization unit 121 and second reflective polarization unit 120, the displaying surface of the electro-optical device 100 becomes visible as a mirror surface. However, in the region in which the first opening 123a and the second opening 123b are provided in the transmission polarization axis conversion unit 106, since the external light is not reflected, the display screen 102 is viewed darkly from the viewing side. Since the external light emitted to the display screen 102 is reflected by the first reflective polarization unit 121 and second reflective polarization unit 120, the external light is emitted from the display screen 102 at a reflectivity of 50% to about 100%. As described above, the electro-optical device 100c according to the present embodiment can realize a bright mirror-state while displaying the region having different contrasts on a part of the display screen 102 in the mirror mode.

Also, in the present embodiment, the electro-optical device 100a can be driven by switching between the mirror mode and the transparent mode by controlling the polarization directions of the light transmitted through the transmission polarization axis conversion unit 106 by the transmission polarization axis conversion unit 106. In the transparent mode, the images output by the display unit 124 can be displayed on the display screen 102. In the mirror mode, the region provided with the opening 123 described above can be used to display the region having different contrasts on a part of the display screen 102. The electro-optical device 100c can display characters, images, patterns, and the like in the mirror mode by using the region having different contrasts of the display screen 102. The electro-optical device 100c can display characters, images, patterns, and the like on the display screen 102 even when the image of the display unit 124 is not displayed on the display screen 102 and can have design property as an interior. As described above, according to the present embodiment, it is possible to display a still image to be compatible with the surrounding environments even when the image output by the display unit 124 is not displayed on the display screen 102 and not viewed.

Furthermore, according to the present embodiment, by arranging the reflective polarization unit 120 on a front surface of the transmission polarization axis conversion unit 106 (a surface on which the external light is incident), in the mirror mode, it is possible to form a brighter mirror-state.

Fourth Embodiment 4-1. Configuration of Electro-Optical Device

A configuration of an electro-optical device 100d according to an embodiment of the present invention will be described with reference to FIGS. 11 and 12. In the following description, a part different from the second embodiment will be mainly described.

The electro-optical device 100d according to the present embodiment differs from the second embodiment in the configuration of the transmission polarization axis conversion unit 106. In this embodiment, the transmission polarization axis conversion unit 106 is provided with an insulating film 134. The insulating film 134 is provided on one or both of the first transparent electrode 110 and the second transparent electrode 116. FIG. 11 shows an embodiment in which the insulating film 134 is provided on the surface of the second transparent electrode 116. Although omitted in FIG. 11, an alignment film is provided on the surface of the first transparent electrode 110, the surface of the second transparent electrode 116, and the surface of the insulating film 134.

Figure 11:
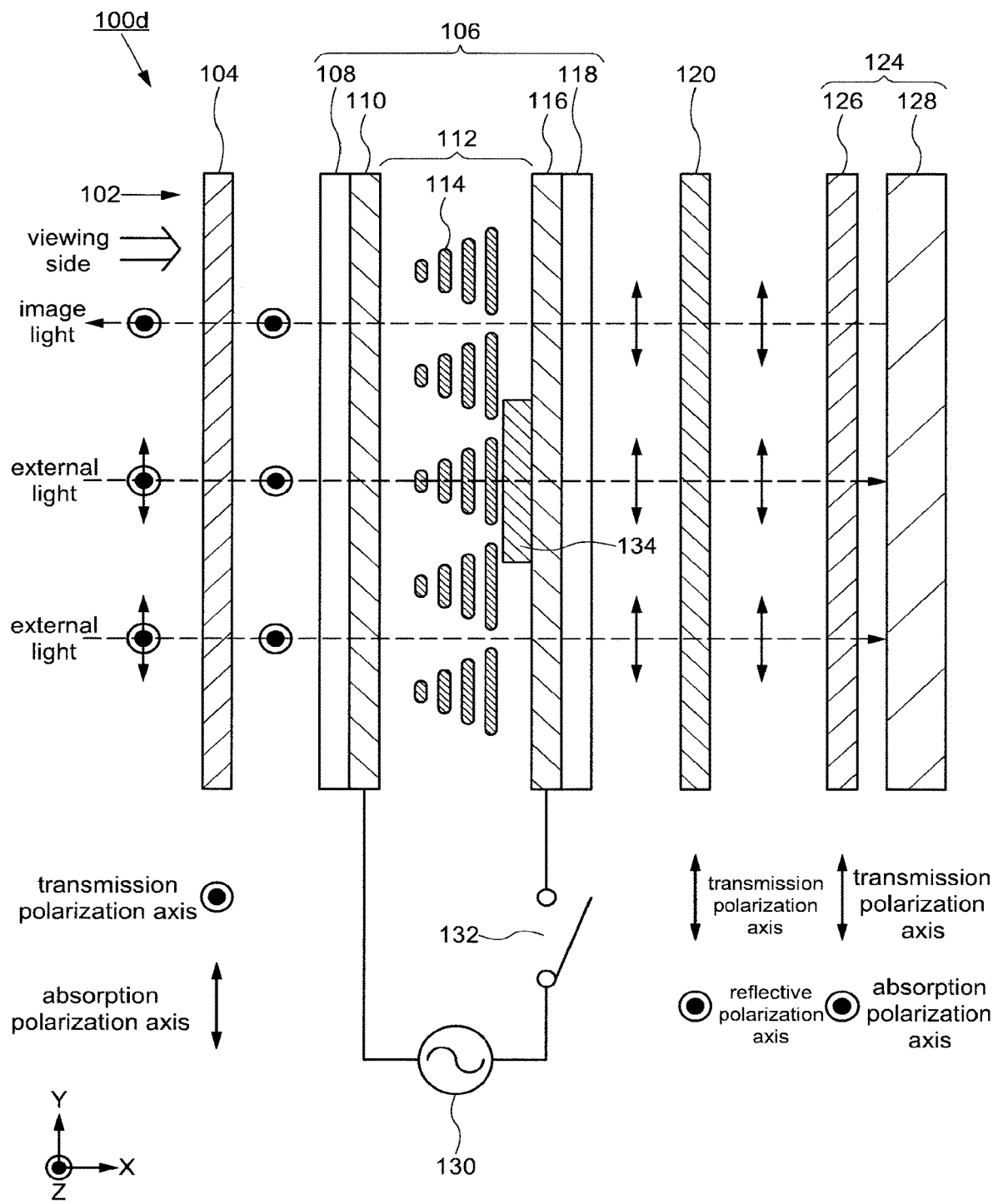
FIG. 11 is a diagram showing a configuration of an electro-optical device according to an embodiment of the present invention, and illustrating a case where a display screen is a transparent mode.
Figure 12:
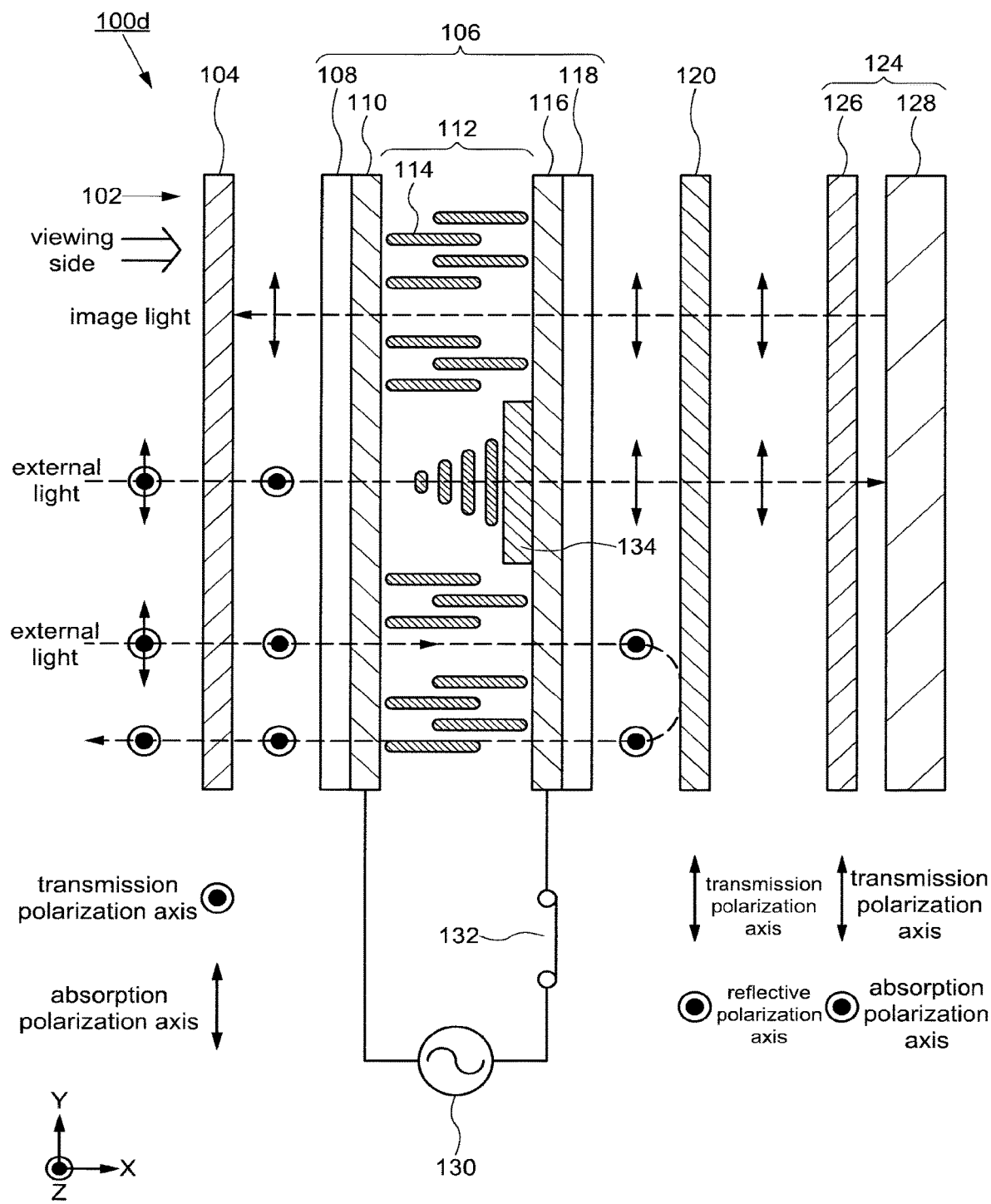
FIG. 12 is a diagram showing a configuration of an electro-optical device according to an embodiment of the present invention, and illustrating a case where a display screen is a mirror mode.

As shown in FIG. 11, when no voltage is applied between the first transparent electrode 110 and the second transparent electrode 116, the liquid crystal molecule 114 of the twisted nematic liquid crystal is twisted by 90 degrees. On the other hand, as shown in FIG. 12, when a voltage is applied between the first transparent electrode 110 and the second transparent electrode 116, the liquid crystal molecule 114 is aligned in a direction parallel to the electric field. However, in a region provided with the insulating film 134, the strength of the electric field applied to the liquid crystal layer 112 is weakened, so that the liquid crystal molecule 114 is hardly aligned in a direction parallel to the electric field. That is, in the region in which the insulating film 134 is provided, even when a voltage is applied between the first transparent electrode 110 and the second transparent electrode 116, the liquid crystal molecule 114 is in a state of being twisted by 90 degrees or in a state of being substantially the same as a state in which a voltage is not applied.

Therefore, as in the case where the transparent electrode is provided with the opening, by providing the insulating film 134 on one or both surfaces of the first transparent electrode 110 and the second transparent electrode 116, it is possible to provide a region in which the liquid crystal molecule 114 does not aligned in the direction parallel to the electric field even when the voltage is applied to the liquid crystal layer 112.

4-2. Operation of Electro-Optical Device

The electro-optical device 100d can be driven in the same manner as the electro-optical device 100b in the second embodiment.

The electro-optical device 100d according to the present embodiment has the same configuration as that of the second embodiment except that the opening is replaced with the insulating film, so that the same operation and effects can be obtained. Further, the configuration of the present embodiment can be implemented in combination with the third embodiment as appropriate.

Fifth Embodiment 5-1. Configuration of Electro-Optical Device

Figure 13:
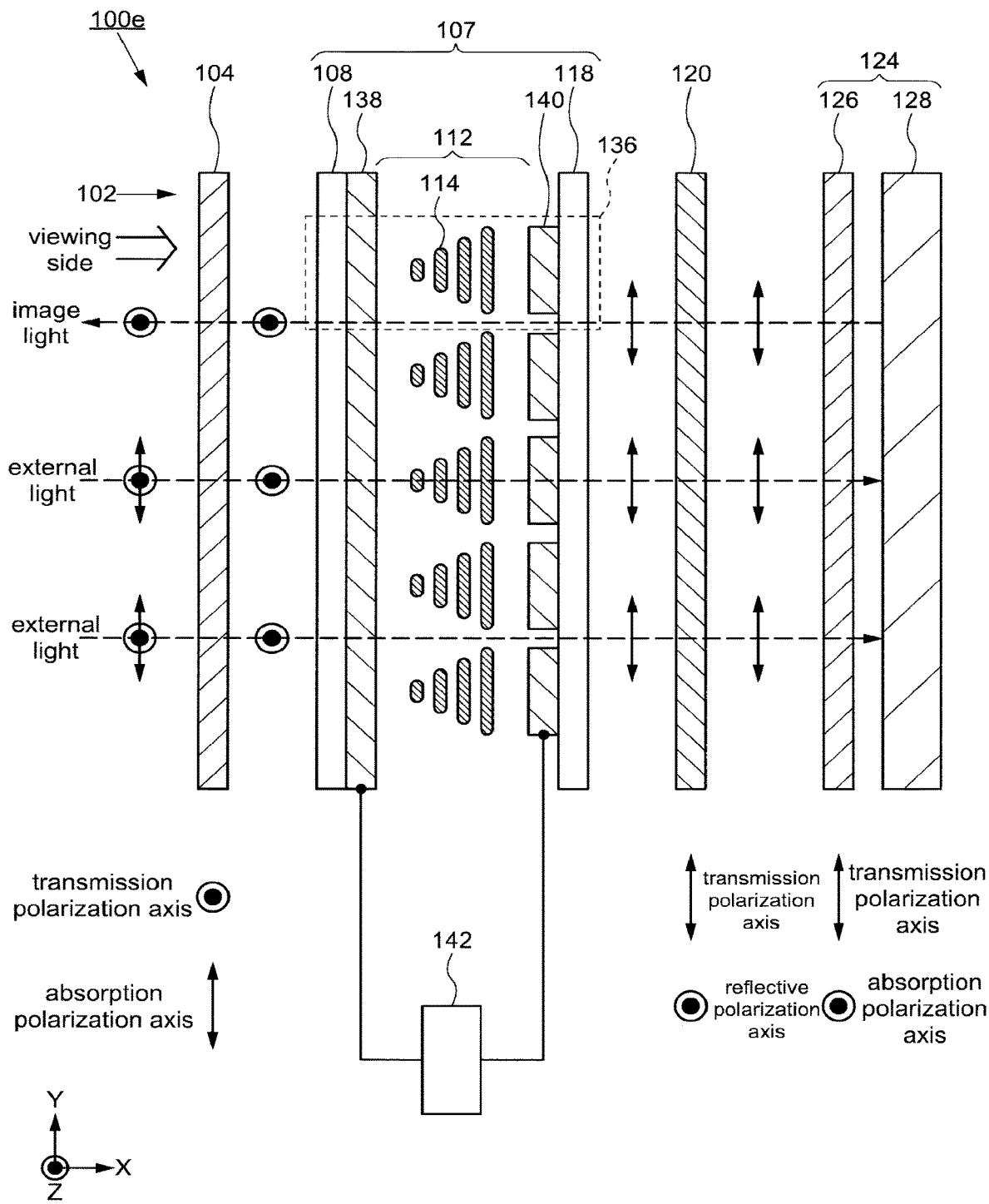
FIG. 13 is a diagram showing a configuration of an electro-optical device according to an embodiment of the present invention, and illustrating a case where a display screen is a transparent mode.

A configuration of an electro-optical device 100e according to an embodiment of the present invention will be described with reference to FIGS. 13 and 14. FIG. 13 schematically shows the structure of the electro-optical device 100e by a cross-sectional structure. In the following description, a part different from the second embodiment will be mainly described.

The electro-optical device 100e according to the present embodiment differs from the transmission polarization axis conversion unit 106 of the second embodiment in the configuration of a transmission polarization axis conversion unit 107. The transmission polarization axis conversion unit 107 according to the present embodiment has a plurality of pixels 136 arranged in a matrix. Each of the plurality of pixels 136 has a configuration in which a plurality of first pixel electrodes 138 and a plurality of second electrodes 140 are oppositely arranged.

FIG. 13 shows a passive matrix type pixel. In the passive matrix type pixel 136, the plurality of striped first pixel electrodes 138 extend in the first direction on the first substrate 108 and is arranged in the second direction. The plurality of striped second pixel electrodes 140 extends in the second direction on the first substrate 108 and is arranged in the first direction. Each of the plurality of first pixel electrodes 138 and the plurality of second pixel electrodes 140 is connected to a driving circuit 142. With this configuration, the liquid crystal molecule 114 of the liquid crystal layer 112 can be controlled in individual pixel units.

5-2. Operation of Electro-Optical Device 5-2-1. Transparent Mode

As shown in FIG. 13, when no voltage is applied between the first pixel electrode 138 and the second pixel electrode 140, the liquid crystal molecule 114 is twisted by 90 degrees. Therefore, the electro-optical device 100e is operated as the transparent mode as described in the second embodiment.

5-2-2. Mirror Mode

Figure 14:
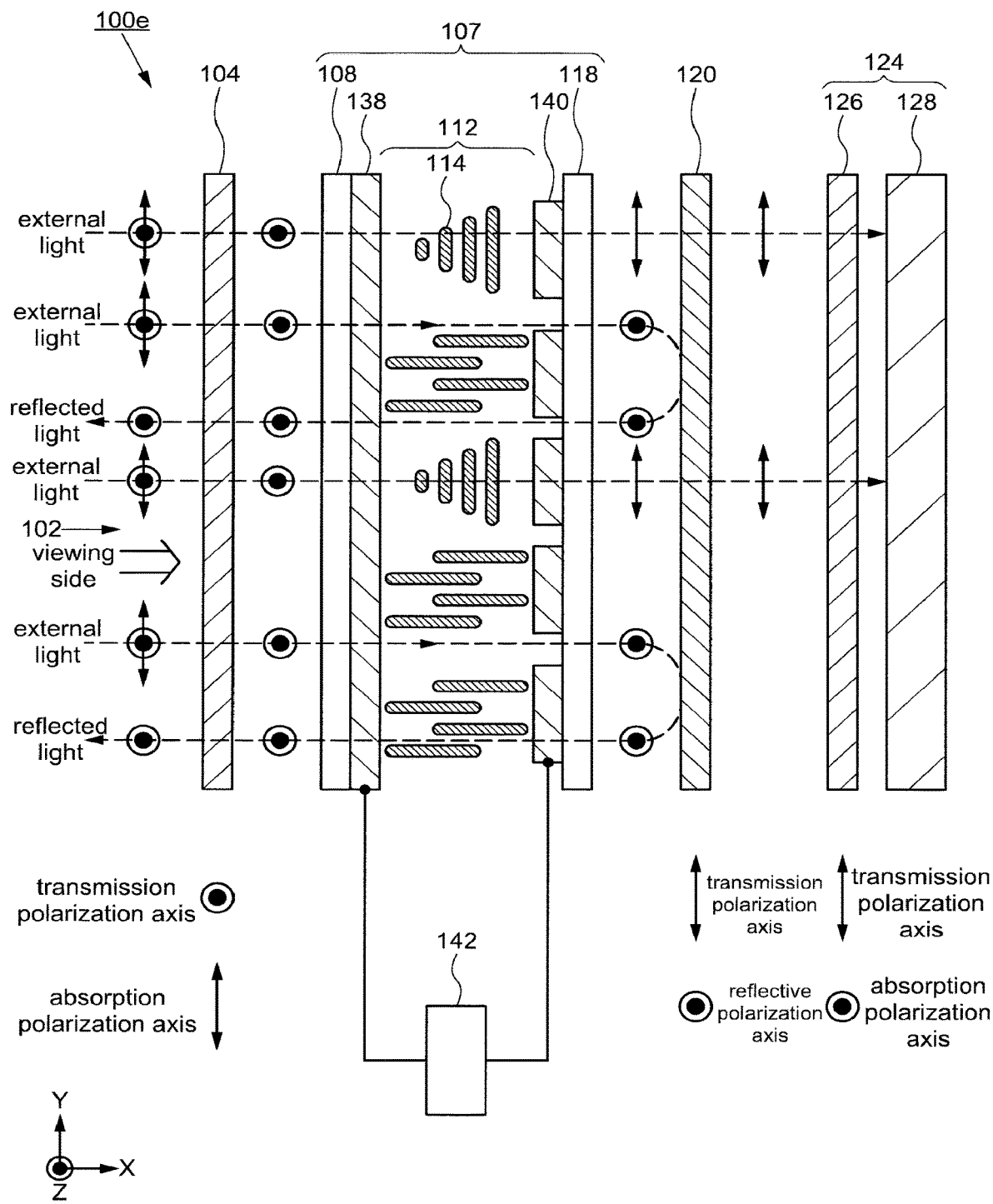
FIG. 14 is a diagram showing a configuration of an electro-optical device according to an embodiment of the present invention, and illustrating a case where a display screen is a mirror mode.

As shown in FIG. 14, when a voltage is applied to a combination of a specific pixel electrode among the plurality of first pixel electrodes 138 and the plurality of second pixel electrodes 140, the alignment of the liquid crystal molecule 114 in a region of the specific pixel can be controlled. When a voltage is applied between all of the electrodes of the plurality of first pixel electrodes 138 and the plurality of second pixel electrodes 140 to eliminate twisting of the liquid crystal molecule 114, the incident light from the display screen 102 is reflected by the reflective polarization unit 120 to allow the reflected light to be visually recognized from the viewing side. Therefore, in order to operate the electro-optical device 100e as the mirror mode, a voltage may be applied between the first pixel electrode 138 and the second pixel electrode 140.

As shown in FIG. 14, when a voltage is applied to some of the pixels of the plurality of pixels 136 and no voltage is applied to the other pixels, a region in which the light transmitted through the transmission polarization axis conversion unit 107 is reflected by the reflective polarization unit 120 and a region that is not reflected are formed in the plane of the transmission polarization axis conversion unit 107. As a result, in the mirror mode, a region having different contrasts can be formed in the display screen 102, and characters, images, patterns, and the like can be displayed. In other words, when the electro-optical device 100e is not displayed, characters, images, patterns, and the like can be displayed on the display screen 102, and design property can be provided as an interior. Furthermore, the characters, images, patterns, and the like to be displayed can be appropriately changed by a signal output from the driving circuit 142. In FIG. 14, the image light output by the display unit 124 is omitted. However, in FIG. 14, the control of the image light output by the display unit 124 is the same as the principles described in the other embodiments.

According to the present embodiment, by providing the plurality of pixels in the transmission polarization axis conversion unit 107, the alignment of the liquid crystal molecule 114 can be controlled for each pixel. That is, the alignment of the liquid crystal molecule 114 of the transmission polarization axis conversion unit 107 can be freely controlled for each region. The electro-optical device 100e can be switched between the mirror mode and the transparent mode by controlling the plurality of pixels provided in the transmission polarization axis conversion unit 107. In the mirror mode, by controlling the alignment state of the liquid crystal molecule 114 for each pixel, it is possible to arbitrarily set a region having different contrasts. The electro-optical device 100e can display characters, images, patterns, and the like by using the region having different contrasts. Further, the electro-optical device 100e can appropriately change characters, images, patterns, and the like of the display screen 102 by controlling the alignment of the liquid crystal molecule 114 for each pixel. As described above, according to the present embodiment, even when the image output by the display unit 124 is not displayed on the display screen 102 and not viewed, the still image can be displayed so as to be compatible with the surrounding environments by using the region having different contrasts.

Sixth Embodiment

This embodiment exemplifies an aspect of the opening 122 provided in the absorption polarization unit 104, which is used in the first embodiment.

6. Configuration of Opening 6-1. Absorption Polarization Unit

Figure 15A:
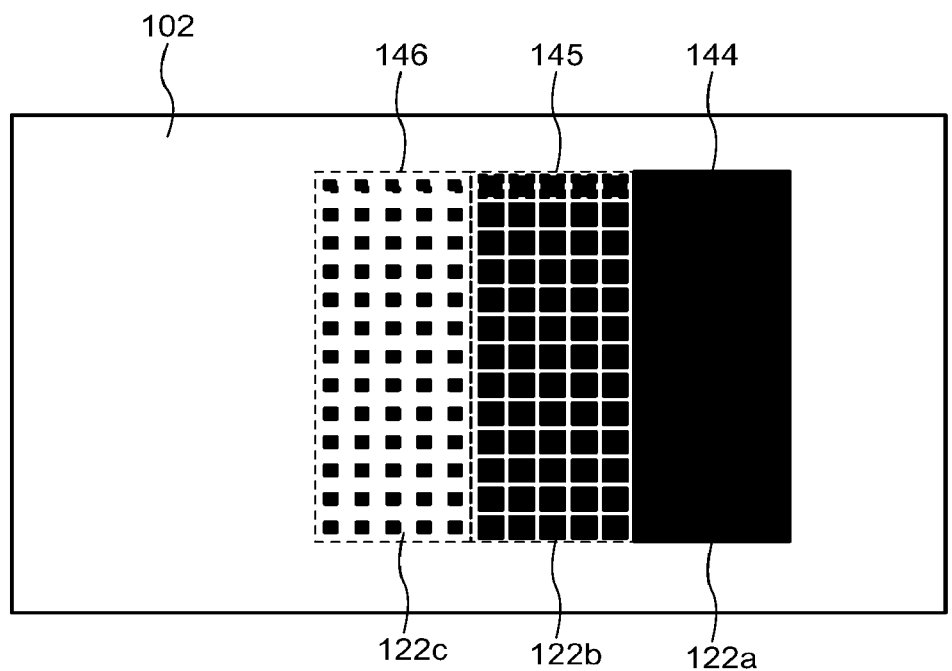
FIG. 15A shows a configuration of an electro-optical device according to an embodiment of the present invention and showing an embodiment of a reflective polarization unit.

FIG. 15A shows a plan view of the reflective polarization unit 120. The reflective polarization unit 120 includes a first region 144, a second region 145, and a third region 146, which are separated for convenience, and each region is provided with an opening. The first region 144, the second region 145, and the third region 146 are arranged along the second direction. An opening 122a of the first region 144 is provided with an opening that penetrates the entire first region 144. In the second region 145, a plurality of openings 122b is provided. The third region 146 is also provided with a plurality of openings 122c. As shown in FIG. 15A, the size of the opening 122 varies from region to region. Comparing the opening sizes (diameters) of the respective region, the opening 122a provided in the first region 144 is the largest. The opening 122b provided in the second region 145 is formed smaller than the opening 122a provided in the first region 144 and larger than the opening 122c provided in the third region 146.

Figure 15B:
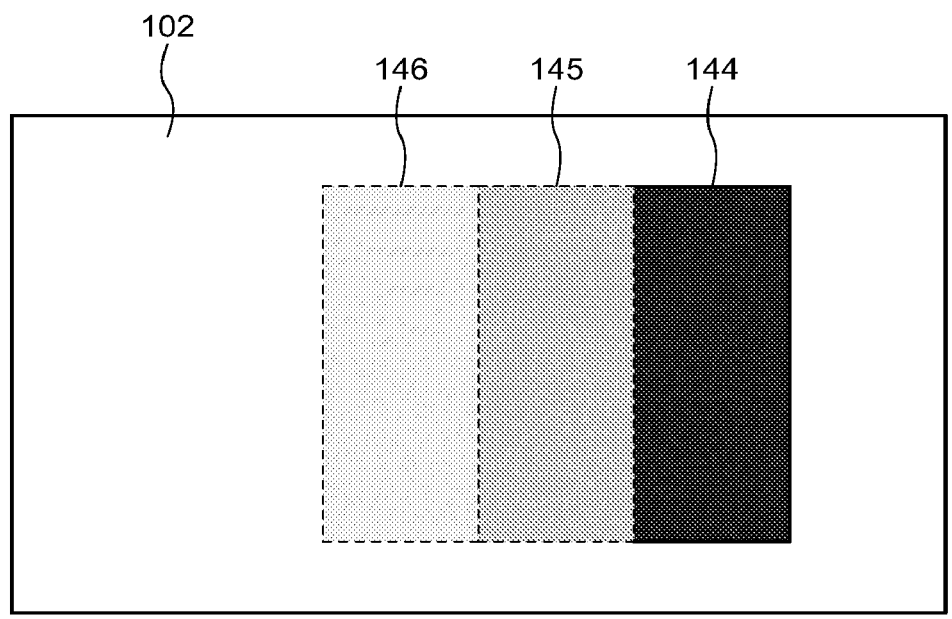
FIG. 15B is a diagram showing a configuration of an electro-optical device according to an embodiment of the present invention and showing an example of images displayed on a display screen.

In the reflective polarization unit 120, the total area of the openings provided in each region affects the reflected light intensity of the region. That is, at every region, the larger area occupied by the opening, the less reflected light. As shown in FIG. 15B, when the electro-optical device 100 is operated in the mirror mode, the contrast of the first region 144, the second region 145, and the third 146 differ. Comparing the contrasts, as compared to the region without the opening, the third region 146 is visually recognized as relatively dark, the second region 145 is visually recognized as the second darkest, and the first region 144 is visually recognized as the darkest.

In this manner, in a region occupying a certain area of the reflective polarization unit 120, by appropriately changing the size of the opening and the number per the unit area, gray scale can be expressed in the images and patterns in the mirror mode. In other words, by adjusting the size of the opening provided on the reflective polarization unit 120 and/or the number per the unit area, gradation can be added to the contoured portions of the images and patterns, and the boundaries can be blurred and displayed. For example, in the mirror mode, monotone images, such as ink paintings, can be displayed.

Although FIG. 15A shows an embodiment in which the size of the opening is changed every three regions, the present invention is not limited to such an embodiment, the area of the opening 122 may be continuously changed along the second direction.

6-2. Configuration of Transmission Polarization Axis Conversion Unit

Although this embodiment has been described the opening provided on the reflective polarization unit 120 in the first embodiment, the same configuration as this can be similarly applied to the opening 122 provided on one or both of the first transparent electrode 110 and the second transparent electrode 116 of the transmission polarization axis conversion unit 106 in the second embodiment and the third embodiment. The insulating film 134 provided on one or both of the first transparent electrode 110 and the second transparent electrode 116 in the fourth embodiment can be similarly applied.

Seventh Embodiment

This embodiment exemplifies a configuration when the electro-optical device is modularized. Specifically, the sealing construction of the electro-optical device and the arrangement of spacers will be exemplified.

7-1. Sealing Structure

Figure 16:
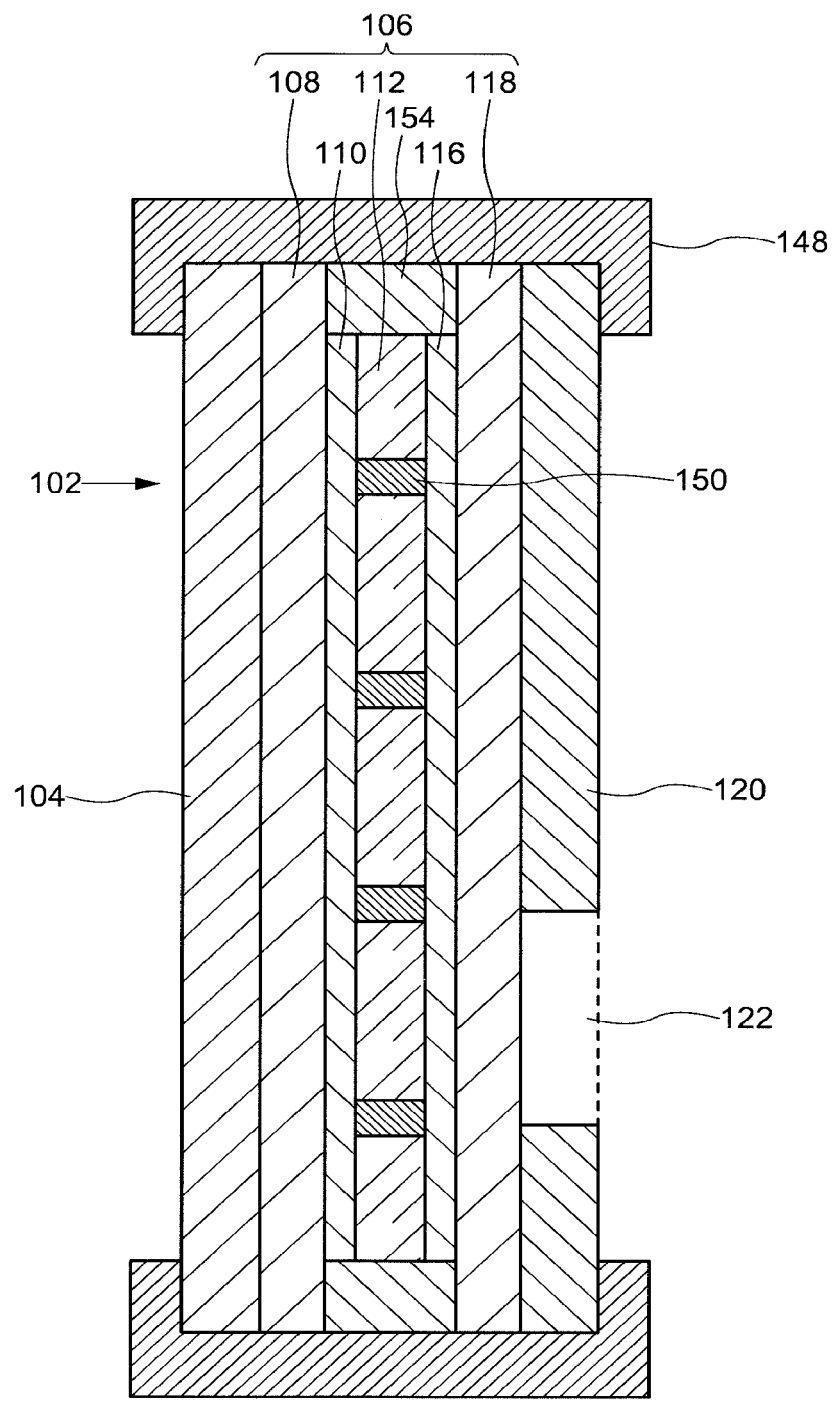
FIG. 16 is a cross-sectional view showing a module structure of an electro-optical device according to an embodiment of the present invention.

FIG. 16 exemplifies a configuration of a module of the electro-optical device 100a shown in the first embodiment. As described in the first embodiment, the electro-optical device 100a includes the absorption polarization unit 104, the transmission polarization axis conversion unit 106, and the reflective polarization unit 120. Outer peripheries (edges) of these members are surrounded by a sealing member 148. The sealing member 148 preferably has a U-shaped configuration. For example, the sealing member 148 is provided to cover the sides of the absorption polarization unit 104, the transmission polarization axis conversion unit 106, and the reflective polarization unit 120 and also to cover the surface-side periphery of the absorption polarization unit 104 and the back surface side periphery of the reflective polarization unit 120. A sealing material may be filled between the sealing member 148 and the absorption polarization unit 104, the transmission polarization axis conversion unit 106, and the reflective polarization unit 120 to be waterproofed.

The sealing member 148 is preferably formed of a resin material such as polyvinyl chloride or a metal material such as aluminum. As the sealing material, a resin material such as silicone or butyl rubber is preferably used.

7-2. Spacer

The transmission polarization axis conversion unit 106 is preferably provided with spacers 150 between the first substrate 108 and the second substrate 118 bonded by a sealing material 154. Even if the area of the display screen 102 is increased, it is possible to maintain a constant thickness of the liquid crystal layer 112 by providing the spacers 150. The electro-optical device 100 can be more stable as a structure by providing the spacers 150.

Figure 17A:
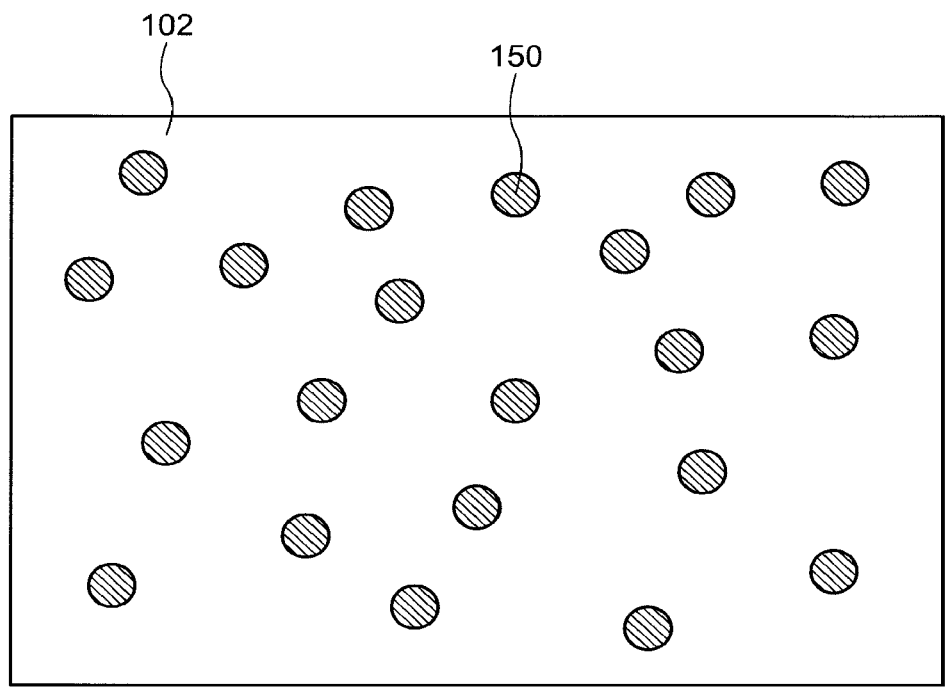
FIG. 17A is a diagram illustrating an arrangement of spacers of a transmission polarization axis conversion unit of an electro-optical device according to an embodiment of the present invention.
Figure 17B:
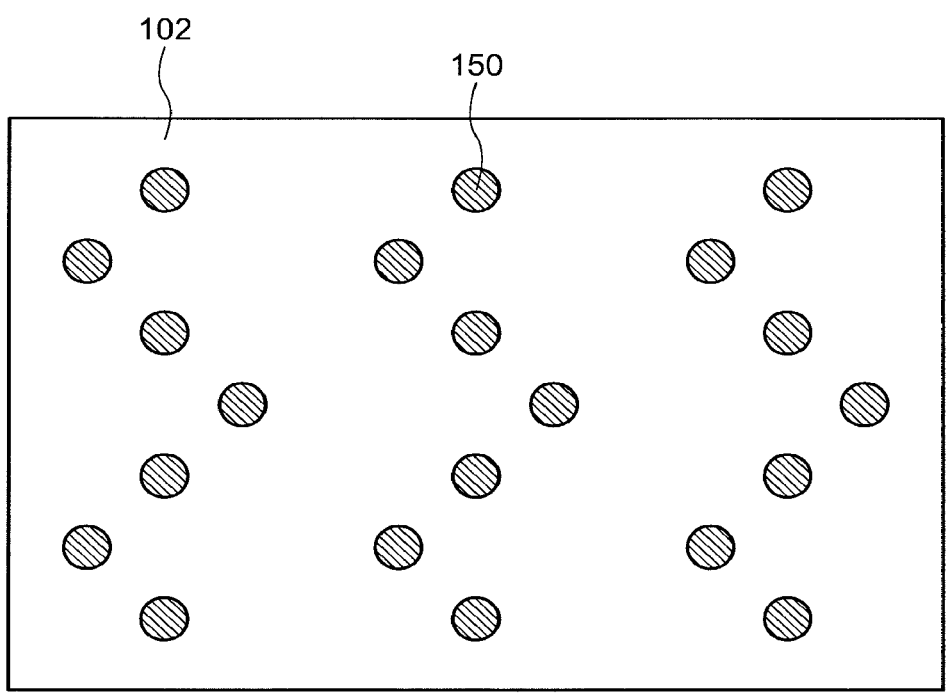
FIG. 17B is a diagram illustrating an arrangement of spacers of a transmission polarization axis conversion unit of electro-optical device according to an embodiment of the present invention.

As the spacers 150, bead spacers and photo spacers (photosensitive spacer) can be used. In particular, the photo spacers have an advantage that it can be formed into a predetermined region by photolithography using a photosensitive resinous material. For example, when the spacers 150 are randomly arranged as shown in FIG. 17A or zigzag arranged as shown in FIG. 17B, moire can be hardly visually recognized in relation to the background.

7-3. Light Shielding Film

Figure 18:
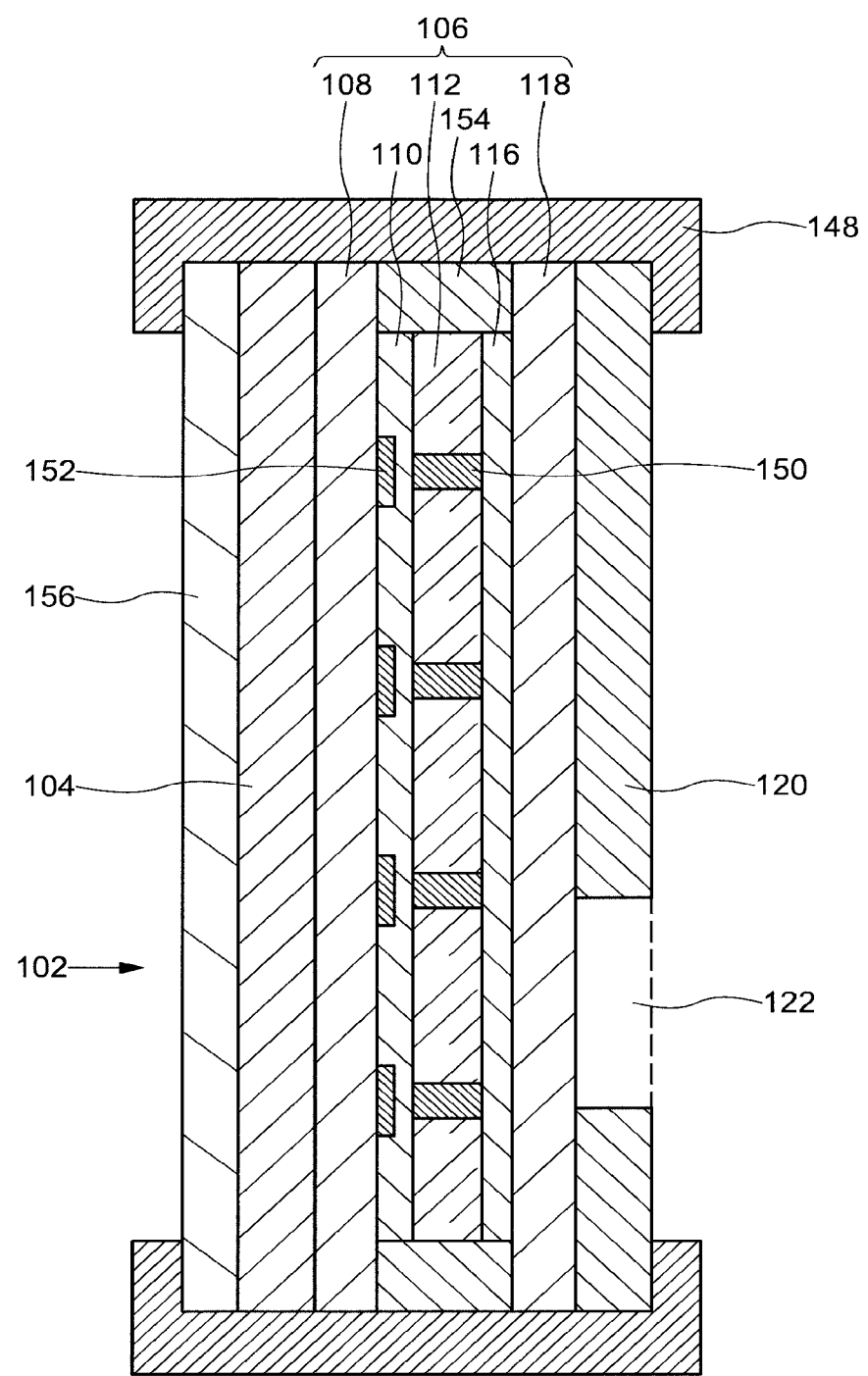
FIG. 18 is a cross-sectional view showing a module structure of an electro-optical device according to an embodiment of the present invention.

FIG. 18 shows another exemplary modularization of electro-optical device 100a shown in the first embodiment. One difference from the module shown in FIG. 16 is that light shielding films 152 are arranged. The light shielding films 152 are preferably arranged in alignment with positions where the spacers 150 are provided. The light shielding films 152 may be provided on at least one of the first substrate 108 and the second substrate 118. For example, the shielding films 152 may be provided on the same substrate as the substrate forming the spacers 150. It is possible to improve the accuracy of alignment of both by forming the light shielding films 152 and the spacers 150 in the same substrate.

The light shielding films 152 may be formed of an insulating material or a conductive material. For example, the light shielding films 152 may be formed of a resinous material comprising a black pigment. The light shielding films 152 may be formed of metallic materials such as titanium (Ti), molybdenum (Mo), chromium (Cr), or the like.

When the spacers 150 are arranged in the liquid crystal layer 112, alignment disturbance of the liquid crystal molecules tends to occur in the periphery thereof. The alignment disturbance of the liquid crystal molecules causes optical leakage and degrades the image quality of the image displayed on the display screen 102. However, the effect of the alignment disturbance of the liquid crystal can be reduced by providing the light shielding films 152 according to the arrangement of the spacers 150.

7-4. Protective Member

As shown in FIG. 18, on the front surface of the display screen 102, i.e. on the viewing side shown in FIG. 1 of the absorption polarization unit 104, a protective member 156 may be provided. The protective member 156 is formed of optical films, optical glasses, and the like. For example, an ultraviolet absorber is preferably contained in the protective member 156. As the protective member 156 which absorbs ultraviolet rays, an ultraviolet absorbing film, an ultraviolet cut glass, or the like can be used. It is possible to prevent degradation of the polarization members (the absorption polarization unit 104, the reflective polarization unit 120) and the liquid crystal layer 112 by providing the protective member 156. Alternatively, degradation can be prevented even when the electro-optical device 100 is placed outdoors. Further, an anti-reflection film may be provided on the surface of the protective member 156, or a non-glare treatment may be performed on the surface as an anti-reflection treatment.

In the present embodiment, the aspect of the modules has been described based on the electro-optical device 100a described in the first embodiment, but the same configuration can be applied to the electro-optical device described in the second to sixth embodiments.

Eighth Embodiment

This embodiment exemplifies a configuration of the electro-optical device in which the absorption polarization unit, the transmission polarization axis conversion unit, the reflective polarization unit, and the display unit are integrated.

Figure 19:
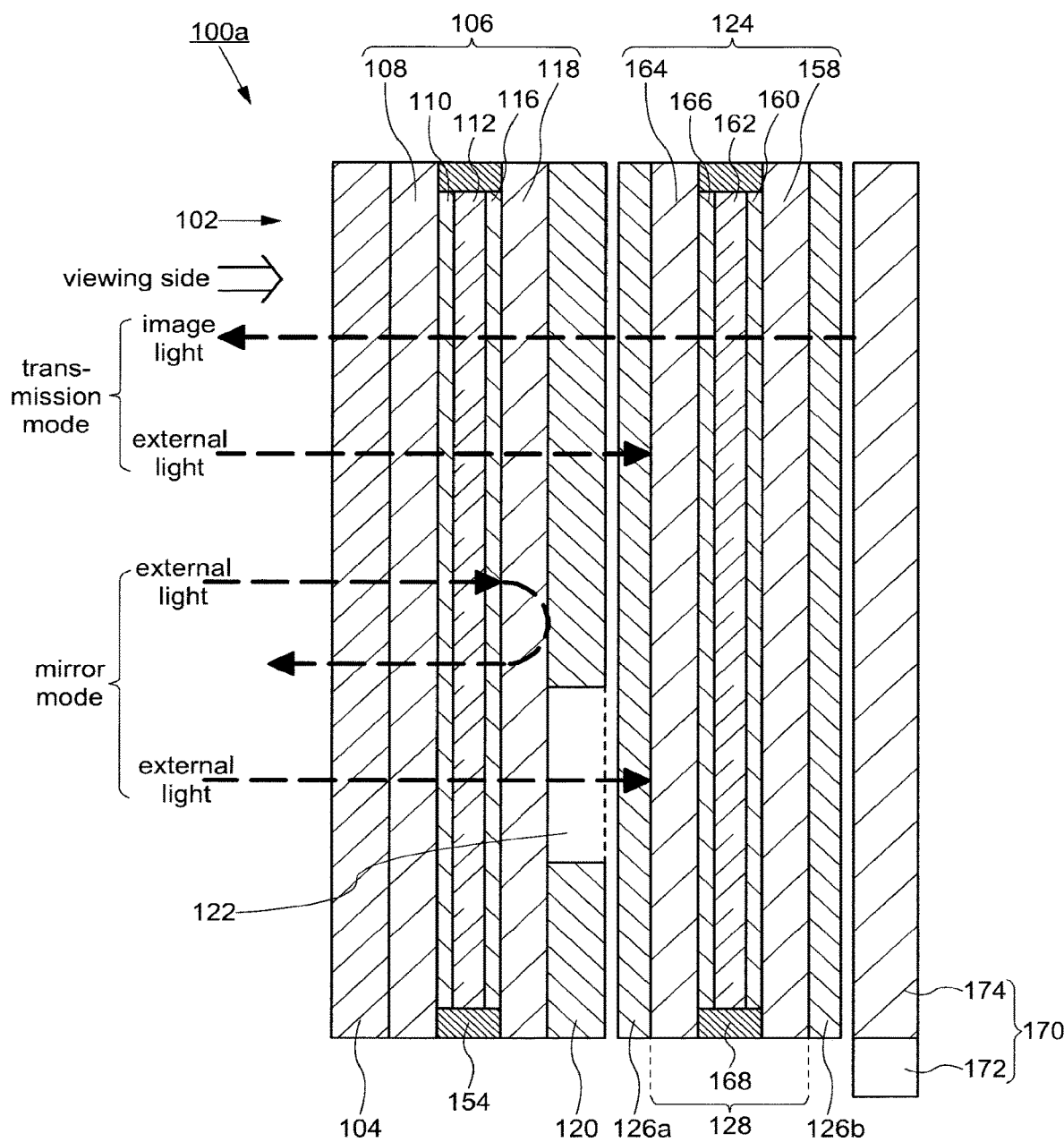
FIG. 19 is a cross-sectional view showing a module structure of an electro-optical device according to an embodiment of the present invention.

FIG. 19 shows a cross-sectional construction of the absorption polarization unit 104, the transmission polarization axis conversion unit 106, the reflective polarization unit 120, and the display unit 124. The absorption polarization unit 104 shown in FIG. 19, the transmission polarization axis conversion unit 106, and the reflective polarization unit 120 has the same configuration as that in the first embodiment. As described in the first embodiment, the opening 122 is provided in a part of the reflective polarization unit 120.

FIG. 19 shows that the display panel 128 is a liquid crystal display panel. The liquid crystal display panel 128 has a configuration in which a array substrate 158 provided with a pixel array 160 and a counter substrate 164 provided with a color filter are bonded together by a sealing material 168, and a liquid crystal layer 162 is provided between the array substrate 158 and the counter substrate 164. The pixel array 160 includes a pixel circuit formed of a thin film transistor and the like, and a pixel electrode and the like electrically connected to the thin film transistor. A color filter 166 has a structure in which a colored layer is arranged corresponding to each pixel.

When the liquid crystal system is TN (Twisted Nematic) method, VA (Vertical Alignment), and MVA (Multi-domain Vertical Alignment) method and the like, a counter electrode may be provided on the counter substrate 164. Further, the polarization plates 126a and 126b are provided to sandwich the liquid crystal display panel 128. A backlight 170 is arranged on the back of the liquid crystal display panel 128. The backlight 170 includes a light source 172 formed of a light emitting diode, a fluorescent tube, and the like, and a light guide plate 174.

FIG. 19 shows both when the electro-optical device 100a is in the transparent mode and in the mirror mode in the same figure. In the transparent mode, the light incident on the display screen 102 is transmitted through the absorption polarization unit 104, the transmission polarization axis conversion unit 106, and the reflective polarization unit 120, is irradiated to the liquid crystal display panel 128. Since the polarization plate 126a is of an absorbing type and the counter substrate 164 is provided with the color filter 166, reflections of the light irradiated on the liquid crystal display panel 128 can be ignored. When the liquid crystal display panel 128 is driven in the transparent mode, the image light is emitted from the display screen 102 through the reflective polarization unit 120, the transmission polarization axis conversion unit 106, and the absorption polarization unit 104. Thus, the image displayed on the liquid crystal display panel 128 is projected on the display screen 102, an observer can view the image projected on the display screen 102 from the viewing side.

In the mirror mode, the light incident on the display screen 102 is reflected by the reflective polarization unit 120 and the reflected light is emitted from the display screen 102. This makes the display screen 102a mirror surface that reflects the external light brightly. Even when the liquid crystal display panel 128 is driven, the image light is blocked by the absorption polarization unit 104 and hardly emitted from the display screen 102, except for a region provided with the opening 122. On the other hand, the external light incident on the region provided with the opening 122 is not reflected by the reflective polarization unit 120. In other words, the region provided in the opening 122 is the non-mirror region. Therefore, when the liquid crystal display panel 128 is not driven, the display screen 102 of the region in which the opening 122 is provided is darkened. Based on the above, in the mirror mode, it is preferable to turn off the backlight by interlocking the operation of the backlight 170 to the operation of the transmission polarization axis conversion unit 106, or to turn off the display of the liquid crystal display panel by interlocking the operation of the liquid crystal display panel 128 to the operation of the transmission polarization axis conversion unit 106. Such operations prevent the image light from leaking or emitting from the display screen 102 of the non-mirror region.

According to the present embodiment, in the electro-optical device 100a, even when the image output by the display unit 124 is not displayed on the display screen 102 (when the image is not viewed or not displayed), the entire display screen does not become black and the sense of intimidation can be reduced. Characters, graphics, patterns, and the like can be displayed on the display screen 102 of the electro-optical device 100a when not viewed or not displayed, so as to be compatible with the surrounding environments. Although this embodiment has shown an aspect in which the liquid crystal display panel is used as the display panel 128, it may be replaced with the organic electroluminescent display panel, the quantum-dot display panel, the micro LED display panel, and the like as the display panel 128.

Although the present embodiment has been described based on the electro-optical device 100a described in the first embodiment, the same configuration can be applied to the electro-optical device described in the second to sixth embodiments.

Ninth Embodiment

The present embodiment exemplifies an application of the electro-optical device. The electro-optical device according to the embodiment of the present invention is not limited to applications for displaying images of various electronic devices such as televisions, computer monitors, personal digital assistants, and the like, and can be applied to various applications.

9-1. Application Example 1

Figure 20A:
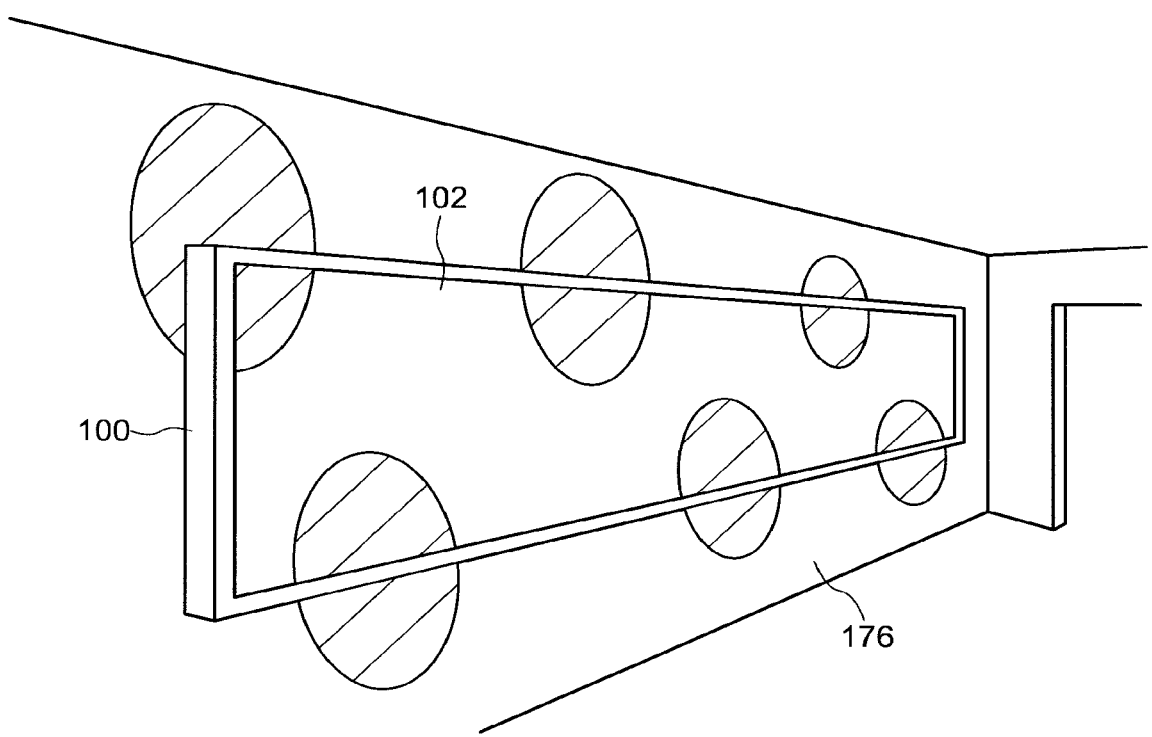
FIG. 20A is a diagram showing an exemplary application of an electro-optical device according to an embodiment of the present invention and showing a state of a transparent mode.
Figure 20B:
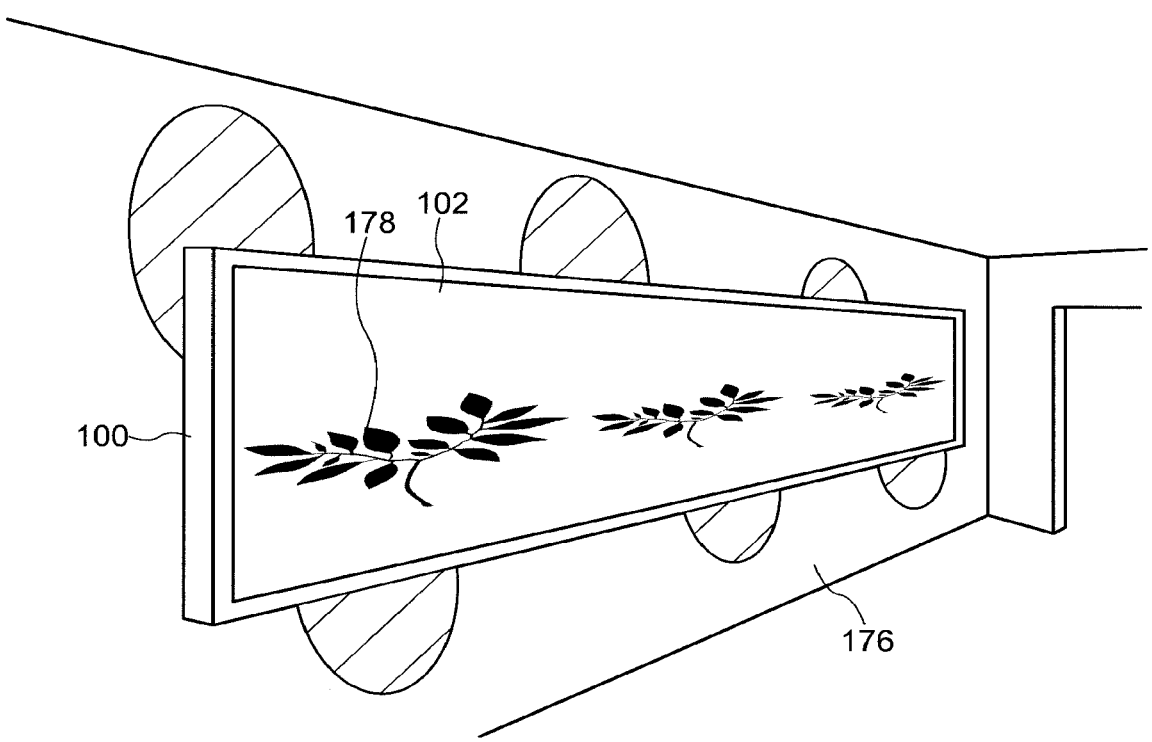
FIG. 20B is a diagram showing an exemplary application of an electro-optical device according to an embodiment of the present invention and showing a state of a mirror mode.

FIGS. 20A and 20B show application examples as a decorative article. As shown in FIGS. 20A and 20B, the electro-optical device 100 can be installed on an inner wall 176 of a room. FIG. 20A shows when the electro-optical device 100 is the transparent mode and a surface of the inner wall 176 can be viewed through the display screen 102. FIG. 20B shows when the electro-optical device 100 is the mirror mode. In the mirror mode, still images 178 such as characters, graphics, patterns, and the like can be displayed on a part or the entire surface of the display screen 102. By switching between the transparent mode and the mirror mode, the electro-optical device 100 can watermark the display screen 102 to show the wall or display the still images 178 on the display screen 102 to change the ambiance of the room.

The location for placing the electro-optical device 100 is not limited to the wall, can be installed on the ceiling, floor, doors, partition plate, the outer wall, the window surface or the like. For example, when the electro-optical device 100 is arranged to fit the window frame, it can be used as a blind.

9-2. Application Example 2

Figure 21A:
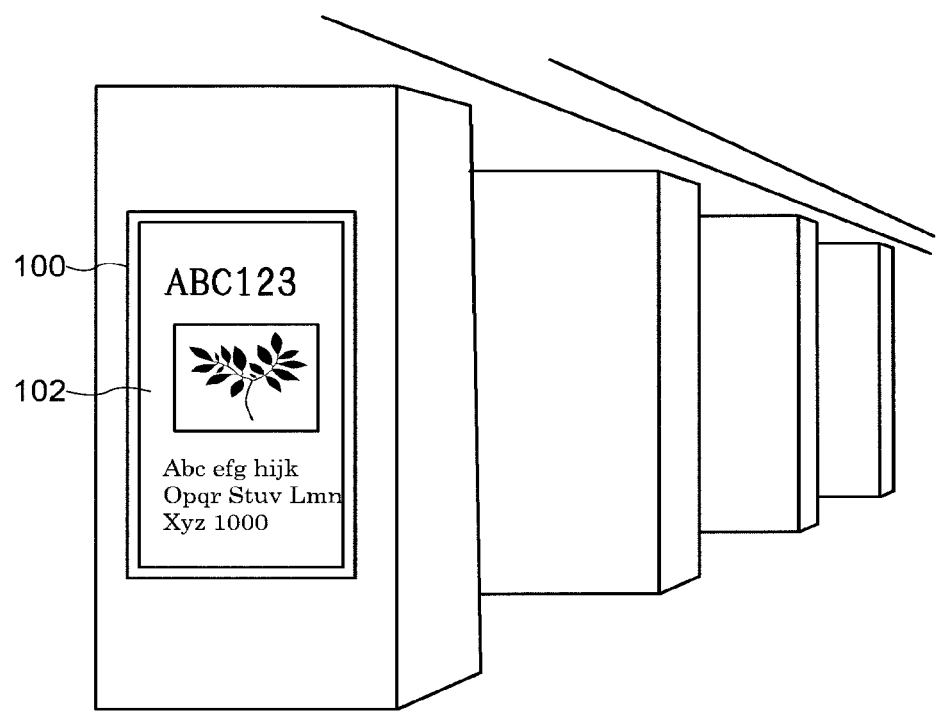
FIG. 21A is a diagram showing an exemplary application of an electro-optical device according to an embodiment of the present invention and showing a state of a transparent mode.
Figure 21B:
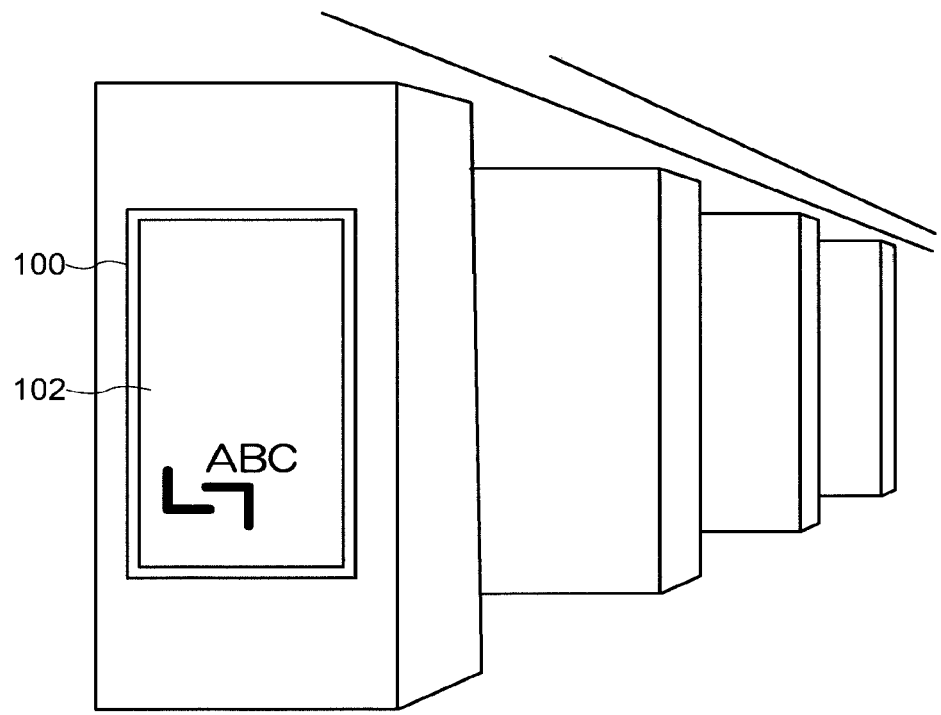
FIG. 21B is a diagram showing an exemplary application of an electro-optical device according to an embodiment of the present invention and showing a state of a mirror mode.

FIGS. 21A and 21B exemplify applications of the electro-optical device 100 to a digital signage (an electronic signboard). The electro-optical device 100, for example, is installed on a column or a wall surface and the like. It may be installed in isolation by using a stand. FIG. 21A shows an aspect in which the display screen 102 displays advertisements when the electro-optical device 100 is the transparent mode. The advertisements to be displayed on the display screen 102 are output from the display unit 124. As for the advertisements to be displayed on the display screen 102, the still images may be appropriately switched, or videos may be displayed. FIG. 21B shows an aspect in which the electro-optical device 100 is used in the mirror mode and the still images are displayed. The display screen may show, for example, the advertiser's logotypes. Since the electro-optical device 100 consumes little power when it is the mirror mode, particularly when it is the mirror mode of the first embodiment, the power consumption of digital signage can be reduced. In addition, even when the digital signage is stopped, the entire display screen does not become black, the sense of intimidation can be reduced, and the landscape can be prevented from being spoiled. In addition, when the mirror mode, the non-mirror region displays escape routes and the like to increase the safety in the event of a power failure due to a disaster and the like.

The electro-optical device according to an embodiment of the present invention is not limited to the above-mentioned applications and can be used for various sites. For example, it can be used for in-vehicle advertisements of vehicles used in public transportations. In addition, it can be used as screen savers in display screens of various electronic apparatuses.

What is claimed is:

1. An electro-optical device, comprising:
   a transmission polarization axis conversion unit having a first surface and a second surface opposite to the first surface;
   an absorption polarization unit having transmission polarization axis in a first direction and having absorption polarization axis in a second direction orthogonal to the first direction;
   a reflective polarization runt including a region having a transmission polarization axis in the first direction and a reflective polarization axis in the second direction, and an opening; and
   a display unit including a display panel and at least one polarizing plate,
   wherein
   the transmission polarization axis conversion unit includes a first substrate, a second substrate disposed opposite the first substrate, a first transparent electrode and a second transparent electrode disposed between the first substrate and the second substrate, and a liquid crystal layer disposed between the first transparent electrode and the second transparent electrode,
   the absorption polarization unit is disposed on a side of the first surface of the transmission polarization axis conversion unit,
   the display unit is disposed on a side of the second surface of the transmission polarization axis conversion unit, and
   the reflective polarization unit is disposed on a side of the second surface of the transmission polarization axis conversion unit and between the transmission polarization axis conversion unit and the display unit,
   wherein
   the transmission polarization axis conversion unit can switch between a first state and a second state,
   the first state is a state in which light of a first linearly polarized light component is converted into light of a second linearly polarized component, and
   the second state is a state in which the light of the first linearly polarized light component is transmitted,
   wherein
   the reflective polarization unit transmits the light of the first linearly polarized light component and reflects the light of the second linearly polarized light component, and
   the opening of the reflective polarization unit transmits the light of the first linearly polarized light component and the light of the second linearly polarized light component,
   wherein
   the at least one polarizing plate is disposed between the reflective polarization unit and the display panel, and
   the at least one polarizing plate transmits the light of the first linearly polarized light component and absorbs the light of the second linearly polarized light component.

2. The electro-optical device according to claim 1, wherein the transmission polarization axis conversion unit includes:
   when voltage is not applied between the first transparent electrode and the second transparent electrode, the first outgoing light is emitted; and
   when voltage is applied between the first transparent electrode and the second transparent electrode, the second outgoing light is emitted.

3. The electro-optical device according to claim 1, wherein
   the first transparent electrode is disposed on the first substrate, the second transparent electrode is disposed on the second substrate, and
   the liquid crystal layer includes a twisted nematic liquid crystal.

4. The electro-optical device according to claim 1, further comprising spacers randomly disposed between the first substrate and the second substrate.

5. The electro-optical device according to claim 1, further comprising spacers disposed zigzag between the first substrate and the second substrate.

6. The electro-optical device according to claim 1, further comprising a protective member for absorbing ultraviolet rays disposed on an outermost surface on the side of the first surface.

7. An electro-optical device, comprising:
   a transmission polarization axis conversion unit having a first surface and a second surface opposite to the first surface;
   an absorption polarization unit or a first reflective polarization unit, the absorption polarization unit having a transmission polarization axis in a second direction and an absorption polarization axis in a first direction orthogonal to the second direction, the first reflective polarization unit having a transmission polarization axis in the second direction and a reflective polarization axis in the first direction;

a second reflective polarization unit having a reflective polarization axis in the second direction and a transmission polarization axis in the first direction; and a display unit including a display panel and at least one polarizing plate, wherein the transmission polarization axis conversion unit includes a first substrate, a second substrate disposed opposite the first substrate, a first transparent electrode and a second transparent electrode disposed between the first substrate and the second substrate, and a liquid crystal layer disposed between the first transparent electrode and the second transparent electrode, the absorption polarization unit or the first reflective polarization unit is, disposed on a side of the first surface of the transmission polarization axis conversion unit, the display unit is disposed on a side of the second surface of the transmission polarization axis conversion unit, and the second reflective polarization unit is, disposed on a side of the second surface of the transmission polarization axis conversion unit and between the transmission polarization axis conversion unit and the display unit, wherein the transmission polarization axis conversion unit can switch between a first state and a second state, the first state is a state in which light of a first linearly polarized light component is converted into light of a second linearly polarized light component, and the second state is a state in which the light of the first linearly polarized light component is transmitted, wherein the liquid crystal layer and at least one of the first transparent electrode and the second transparent electrode have a first region which does not overlap in a plan view, the transmission polarization axis conversion unit cannot switch between the first state and the second state in the first region, and the light of the second linearly polarized light component and the light of the second linearly polarized light component is transmitted in the first region, wherein the reflective polarization unit transmits the light of the first linearly polarized light component and reflects the light of the second linearly polarized light component, the at least one polarizing plate is disposed between the reflective polarization unit and the display panel, and the at least one polarizing plate transmits the light of the first linearly polarized light component and absorbs the light of the second linearly polarized light component.

8. The electro-optical device according to claim 7, wherein one or both the first transparent electrode and the second transparent electrode have openings in the first region.

9. The electro-optical device according to claim 7, further comprising an insulating film disposed between one or both the first transparent electrode and the second transparent electrode and the liquid crystal layer in the first region.

10. The electro-optical device according to claim 7, wherein the liquid crystal layer includes a twisted nematic liquid crystal.

11. The electro-optical device according to claim 10, wherein one of the first transparent electrode and the second transparent electrode has a second region and a third region separated from the second region, the first region is located between the second region and the third region, and the second region can be controlled to the transparent mode, and the third region can be controlled to the mirror mode.

12. The electro-optical device according to claim 7, wherein one of the first transparent electrode and the second transparent electrode has a second region and a third region separated from the second region, the first region is located between the second region and the third region, and an alignment of liquid crystal molecules in the liquid crystal layer facing the second region and an alignment of liquid crystal molecules in the liquid crystal layer facing the third region can be controlled to be different from each other.

* * * * *